(12) United States Patent
Shultz et al.

(10) Patent No.: US 8,683,105 B1
(45) Date of Patent: Mar. 25, 2014

(54) MODULAR AVIONICS SYSTEM

(75) Inventors: Roger K. Shultz, Iowa City, IA (US);
Raymond E. Knoff, Vinton, IA (US);
Joshua R. Bertram, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 257 days.

(21) Appl. No.: 13/224,899

(22) Filed: Sep. 2, 2011

(51) Int. Cl.
*G06F 13/00* (2006.01)
*G06F 3/00* (2006.01)

(52) U.S. Cl.
USPC .............................. 710/300; 710/36; 709/230

(58) Field of Classification Search
USPC ........................... 710/8, 15, 36, 300; 709/230
See application file for complete search history.

(56) References Cited

U.S. PATENT DOCUMENTS

| | | | | |
|---|---|---|---|---|
| 5,807,109 | A * | 9/1998 | Tzidon et al. ................ | 434/35 |
| 6,038,498 | A * | 3/2000 | Briffe et al. ................ | 701/3 |
| 7,114,171 | B2 * | 9/2006 | Brady et al. ................ | 725/77 |
| 8,019,489 | B2 * | 9/2011 | Harrison et al. ............ | 701/3 |
| 8,064,347 | B2 * | 11/2011 | Dietz et al. ................ | 370/241 |
| 8,150,815 | B2 * | 4/2012 | Vian et al. ................ | 707/693 |
| 8,301,867 | B1 * | 10/2012 | Mazuk et al. ............... | 712/36 |
| 2004/0015630 | A1 * | 1/2004 | Boolos et al. ............. | 710/300 |
| 2004/0162648 | A1 * | 8/2004 | Bontrager et al. .......... | 701/3 |
| 2006/0095162 | A1 * | 5/2006 | Schafer et al. ............ | 700/275 |
| 2007/0230330 | A1 * | 10/2007 | Dietz et al. .............. | 370/216 |
| 2011/0004832 | A1 * | 1/2011 | Canal et al. ............... | 715/758 |
| 2012/0226389 | A1 * | 9/2012 | Righi et al. ............... | 701/1 |

* cited by examiner

*Primary Examiner* — Christopher Shin
(74) *Attorney, Agent, or Firm* — Donna P. Suchy; Daniel M. Barbieri

(57) ABSTRACT

The modular avionics system may include one or more centralized processing line-replaceable units (LRUs), the centralized processing LRUs including at least one multi-core computer processor, one or more multi-function display (MFD) units configured to receive imagery data from the centralized processing LRUs and display the imagery data on a display device, one or more control display units (CDUs) configured to receive imagery data from the centralized processing LRUs and display the imagery data on a display device, the MFD units and the CDUs including one or more user input devices, the MFD units and the CDUs including at least one logic module, the CDUs and the MFD units configured to transmit user input data from the user input devices to the centralized processing LRUs, the centralized processing LRUs constructed from a plurality of component slices, wherein a first component slice and at least a second component slice are reversibly couplable.

24 Claims, 20 Drawing Sheets

MODULAR AVIONICS SYSTEM

TECHNICAL FIELD

The present invention generally relates to avionics systems, and more particularly to a modular avionics system constructed in accord with a slice-based architecture scheme.

BACKGROUND

Due to the ever growing performance and cost demands on the manufacture and maintenance of avionics systems, it is desirable to produce an improved avionics system architecture. FIG. 1 depicts a typical distributed avionics system 100 containing processors of varying capabilities distributed among various line replaceable units (LRUs) of the system 100. For example, each of the various multi-function displays (MFDs) (e.g., co-pilot MFD 102, pilot MFD 104, or center MFD 106) may include, among other things, a mission processor and display processor. Moreover, the control display units (e.g., co-pilot CDU 108 or pilot CDU 109) of traditional avionics systems 100 typically include a single signal processor. In this setting, each of the LRUs, such as the MFDs, CDUs, and graphics processing units (GPPU) (e.g., 110 or 112) of the avionics system 100, are typically coupled to one or more busses. For instance, one or more of the various LRUs may be coupled to SMPTE (e.g., 114 or 116), avionics LAN 118, commercial Ethernet 120, or MIL-STD 1553 Ethernet 122 as depicted in FIG. 1. Traditional avionics systems, such as those illustrated in FIG. 1, struggle to meet advanced processing and high-speed interconnection demands. As such, it is desirable to produce an advanced avionics system which expands current avionics processing and interconnection capabilities, while at the same time more efficiently managing other metrics such as weight, overall size, power demands, and the like.

SUMMARY

A modular avionics system is disclosed. In one aspect, the modular avionics system may include, but is not limited to, one or more centralized processing line-replaceable units (LRUs), wherein the one or more centralized processing LRUs include at least one multi-core computer processor; one or more multi-function display (MFD) units configured to receive imagery data from the one or more centralized processing LRUs and display the imagery data on at least one display device of the one or more MFD units; one or more control display units (CDUs) configured to receive imagery data from the one or more centralized processing LRUs and display the imagery data on at least one display device of the one or more CDUs, wherein each of the one or more MFD units and the one or more CDUs include one or more user input devices, wherein each of the one or more MFD units and the one or more CDUs include at least one logic module, wherein the one or more CDUs and the one or more MFD units are configured to transmit user input data from the user input devices to the one or more centralized processing LRUs, wherein the one or more centralized processing LRUs are constructed from a plurality of component slices, wherein a first component slice of the plurality of component slices and at least a second component slice of the plurality of component slices are reversibly couplable via a high-speed common interconnection.

In another aspect, the modular avionics system may include, but is not limited to, one or more centralized processing line-replaceable units (LRUs), wherein the one or more centralized processing LRUs includes a plurality of computation devices; one or more multi-function display (MFD) units configured to receive imagery data from the one or more centralized processing LRUs and display the imagery data on at least one display device of the one or more MFD units; one or more control display units (CDUs) configured to receive imagery data from the one or more centralized processing LRUs and display the imagery data on at least one display device of the one or more CDUs, wherein each of the one or more MFD units and the one or more CDUs include one or more user input devices, wherein each of the one or more MFD units and the one or more CDUs include at least one logic module, wherein the one or more CDUs and the one or more MFD units are configured to transmit user input data from the user input devices to the one or more centralized processing LRUs, wherein the one or more centralized processing LRUs are constructed from a plurality of component slices, wherein a first component slice of the plurality of component slices and at least a second component slice of the plurality of component slices are reversibly couplable via a high-speed common interconnection.

In another aspect, the modular avionics system may include, but is not limited to, one or more centralized processing line-replaceable units (LRUs), wherein the one or more centralized processing LRUs include at least one multi-core computer processor; one or more multi-function display (MFD) units configured to receive imagery data from the one or more centralized processing LRUs and display the imagery data on at least one display device of the one or more MFD units; and one or more control display units (CDUs) configured to receive imagery data from the one or more centralized processing LRUs and display the imagery data on at least one display device of the one or more CDUs, wherein each of the one or more MFD units and the one or more CDUs include one or more user input devices, wherein each of the one or more MFD units and the one or more CDUs include at least one logic module, wherein the one or more CDUs and the one or more MFD units are configured to transmit user input data from the user input devices to the one or more centralized processing LRUs, wherein at least one of the one or more centralized processing LRUs, the one or more MFD units, or the one or more CDUs are constructed utilizing a slice-based architecture.

BRIEF DESCRIPTION OF THE DRAWINGS

The numerous advantages of the disclosure may be better understood by those skilled in the art by reference to the accompanying figures in which.

DETAILED DESCRIPTION OF THE INVENTION

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention. Reference will now be made in detail to the subject matter disclosed, which is illustrated in the accompanying drawings.

Referring generally to FIGS. 2 through 17B, a modular avionics system having a slice-based architecture 200 is described in accordance with the present disclosure. In one aspect, the present disclosure is directed at a modular avionics infrastructure configured to provide modularity within a given avionics system. Throughout the present invention the term 'slices' will be used to refer to a self-contained rack which may be combined with other 'slices' to build up a line replaceable unit (LRU) of the modular avionics system 200 of the present invention. Each of the slices of a given LRU may be manufactured and test independently, leading to cost benefits when manufacturing, repairing, or upgrading an LRU. Moreover, the slices of a given LRU may be easily connected and disconnected from adjacent slices, providing ease of scalability and reconfigurability of the system 200. In another aspect, the present invention is also directed toward a modular avionics system 200 which provides centralized processing capabilities and high throughput interconnects, allowing for all processing functions of the modular avionics system 200 to occur in centralized processing LRUs (e.g., co-pilot central processing LRU 212 or pilot central processing LRU 214).

Figure 1:
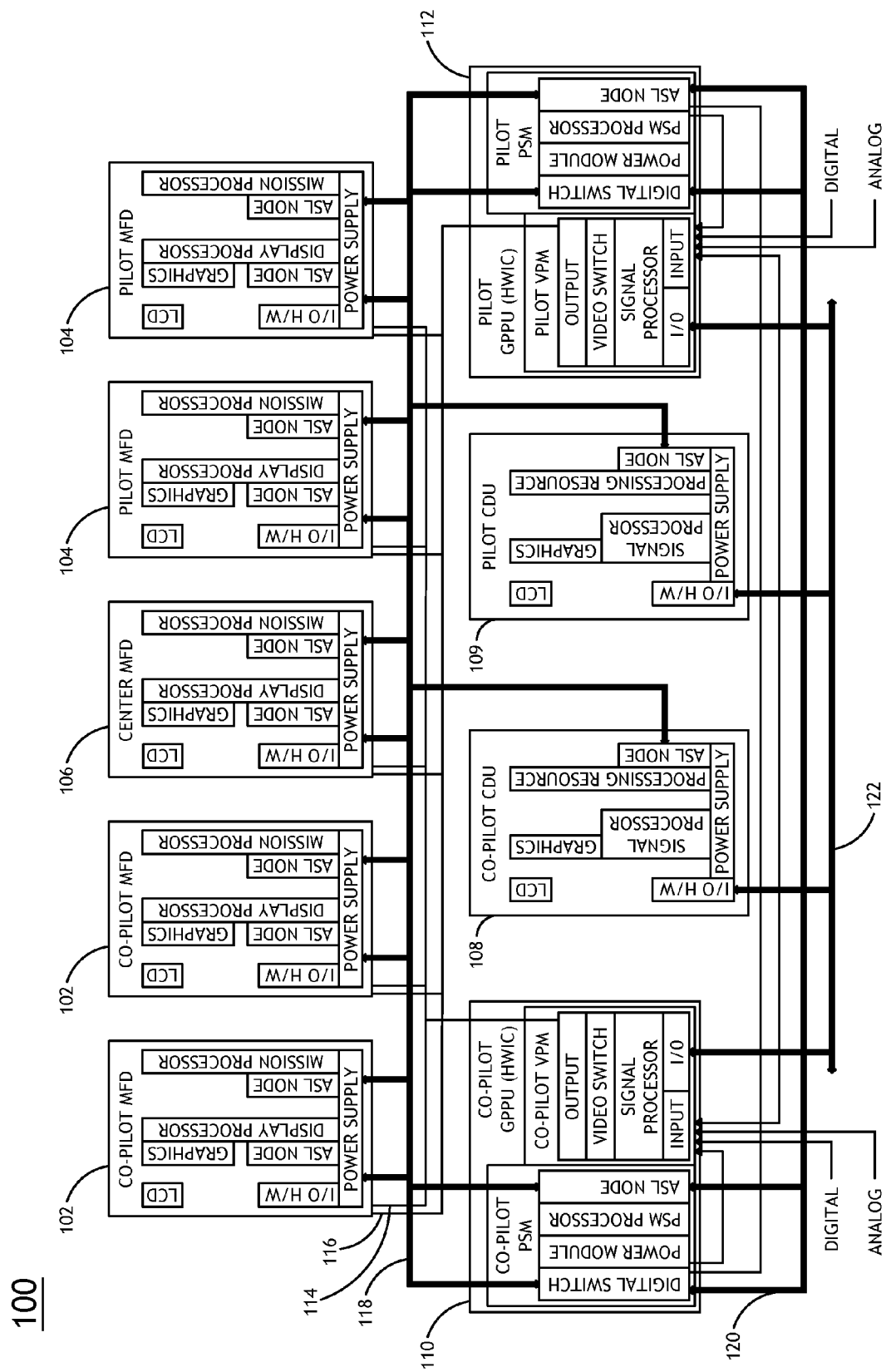
FIG. 1 is a block diagram of an avionics system, in accordance with one example from the prior art.
Figure 2:
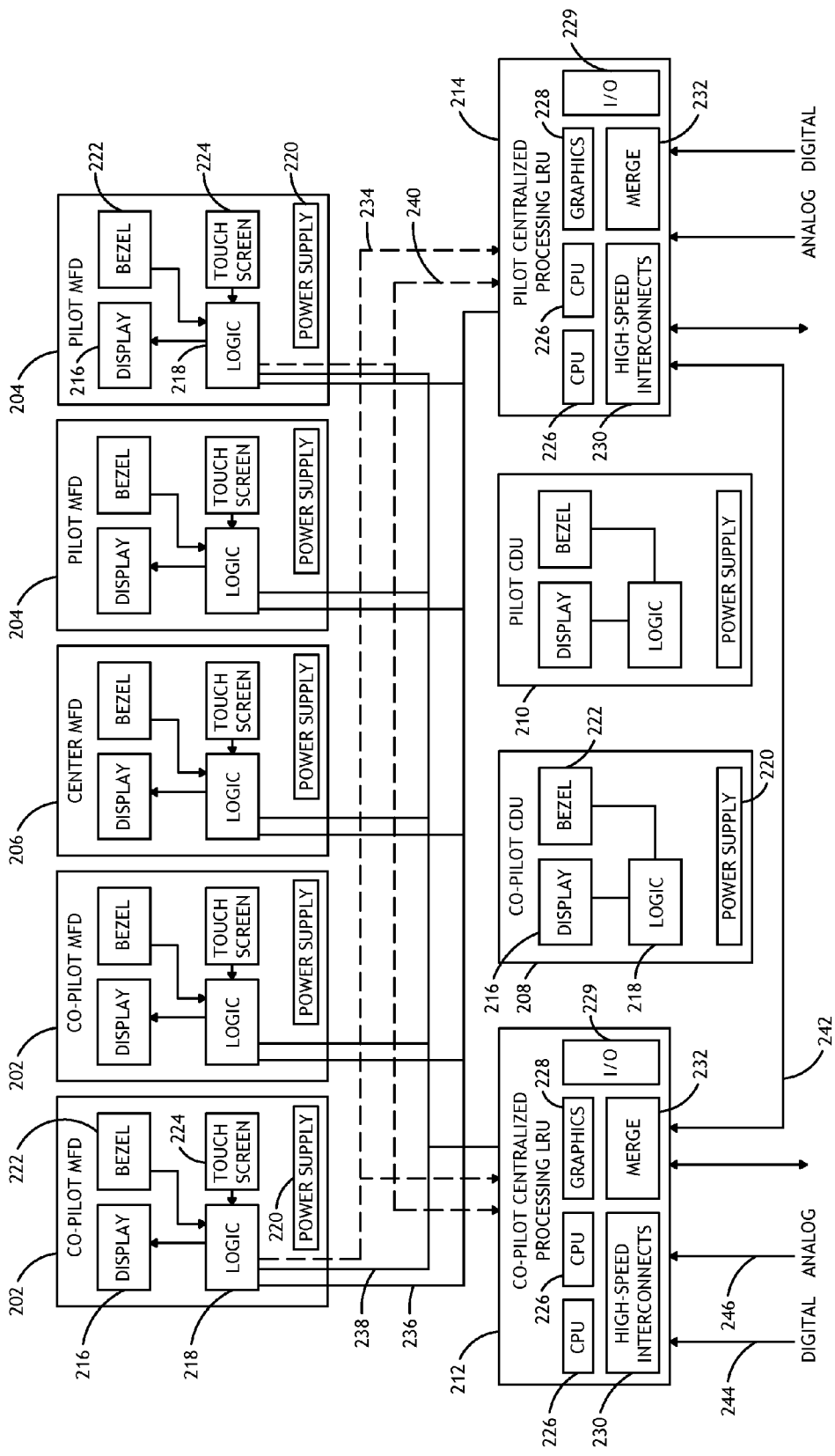
FIG. 2 is a block diagram of a modular avionics system, in accordance with one embodiment of the present invention.

FIG. 2 illustrates a block diagram view of a slice-constructed modular avionics system 200 in accordance with an exemplary embodiment of the present invention. The modular avionics system 200 may include one or more centralized processing LRUs. For example, the system 200 may include a co-pilot centralized processing LRU 212 and a pilot centralized processing LRU 214. In this manner, the processing power of the system 200 may be concentrated into one or more centralized processing LRUs (e.g., 212 or 214). In another aspect, the system 200 includes one or more multi-function displays (MFDs). For example, the system 200 may include one or more co-pilot MFDs 202, one or more pilot MFDs 204, and one or more center MFDs 206. In an additional aspect, the system 200 includes one or more control display units (CDUs). For example, the system 200 may include one or more co-pilot CDUs 208 and one or more pilot CDUs 210.

In a further aspect of the present invention, the one or more MFDs and the one or more CDUs of the system 200 may be communicatively coupled to one or more of the centralized processing LRUs (e.g., 212 or 214) of the system 200. In this manner, imagery data, such as analog or digital video data, may be transmitted from the one or more centralized processing LRUs of the system 200 to the MFDs and/or CDUs of the system 200. For example, imagery data processed by the pilot centralized processing LRU 214 may be transmitted to the pilot MFDs 202, the pilot MFDs 204, and the center MFD 206 via datalink 236, such as a datalink operating on the Digital Visual Interface (DVI) standard or a datalink operating on the Society of Motion Pictures and Television Engineers (SMPTE) standard. Similarly, imagery data processed by the co-pilot centralized processing LRU 212 may be transmitted to the co-pilot MFDs 202, the pilot MFDs 204, and the center MFD via datalink 238 (e.g., DVI or SMPTE).

In addition, user input may be transmitted from the one or more MFDs and/or CDUs of the system 200 to the one or more centralized processing LRUs. For example, user input data (e.g., bezel keypress input or touchscreen input) may be transmitted from the co-pilot MFDs 202, the pilot MFDs 204, and/or the center MFD to the co-pilot and pilot centralized processing LRU, 212 and 214, via a datalink. For instance, user input data may be transmitted from a co-pilot MFD 202 to the co-pilot centralized processing LRU 212 and the pilot centralized processing LRU 214 via datalink 234. In another instance, user input data may be transmitted from a pilot MFD 204 to the co-pilot centralized processing LRU 212 and the pilot centralized processing LRU 214 via datalink 240. It should be recognized that similar datalinks (not shown) may be utilized to transmit user input data from the additional MFDs (e.g., center MFD 206) and/or CDUs (e.g., co-pilot CDU 208 or pilot CDU 210) of the system 200 to the pilot and co-pilot centralized processing LRUs, 212 and 214. In this manner, the centralized processing LRUs (e.g., 212 or 214) may process the user inputted data (e.g., bezel keypress information or touchscreen input information) transmitted from the MFDs and CDUs of the system 200 and update the images displayed on the MFDs and CDUs by transmitting the processed information back to the MFDs and CDUs of the system 200.

In another aspect of the present invention, one or more of the LRUs of the system may be constructed utilizing a slice-based architecture. A given LRU (e.g., centralized processing LRU, MFD, or CDU) may be constructed from a series of 'slices,' wherein each slice is dedicated to a given component or group of components of the LRU. Each of the slices of a given LRU is communicatively and electrically couplable to an adjacent slice via a common interconnection scheme. In this regard, an LRU constructed via the slice-based architecture of the present invention is scalable and reconfigurable, allowing each slice to be developed and tested independently, while allowing a user to expand or update a given LRU by replacing only the pertinent slices (e.g., CPU slice, graphics slice, and the like) of the given LRU. The slice-based architecture of the present invention will be described in greater detail further herein.

The one or more centralized processing LRUs (e.g., 212 or 214) of the system 200 may include one or more computation devices (e.g., multi-core processors 226, one or more single-core processors, one or more reconfigurable logic devices (e.g., FPGAs), or one or more special purpose logic devices (e.g., ASICs)), a graphics module 228, an I/O module 229, a merge module 232, and a plurality of high-speed interconnections 230. Applicant notes that the remainder of the instant disclosure focusing on the implementation of the present invention utilizing multi-core processors. It is noted, however, that the following disclosure should not be interpreted as being limited to multi-core processors, but should be interpreted to extend to various computation devices, unless otherwise stated.

It is contemplated herein that any multi-core processor known in the art may be suitable for implementation in the centralized processing LRUs of the system 200. For example, the multi-core processors 226 of the co-pilot centralized processing LRU 212 or the pilot centralized processing LRU 214 may include a Freescale P4080, a Freescale P4040, or a Freescale P3041 based multi-core processor system. In another example, the multi-core processors 226 of the co-pilot centralized processing LRU 212 or the pilot centralized processing LRU 214 may include an Intel-based multi-core processor system.

In one embodiment, the one or more centralized processing LRUs (e.g., 212 or 214) of the system 200 may be configured to have a single multi-core processing type. In this regard, each of the multi-core processors 226 of a given centralized processing LRU is identical. For instance, the co-pilot centralized processing LRU 212 may implement four Freescale P4080 multi-core processors.

In another embodiment, a single centralized processing LRU of the system 200 may be configured to implement multiple multi-core processing types. In this regard, two or more of the multi-core processors 226 of a given centralized processing LRU may be of a different type. For instance, the pilot centralized processing LRU 214 may implement two Freescale based multi-core processors (e.g., P4080) and two Intel based multi-core processors (e.g., x86 processor). It is contemplated herein that the utilization of different processor types in a single centralized processing LRU may aid in eliminating common modes of failure within the given LRU.

In another embodiment, two or more centralized processing LRUs of the system 200 may be configured to implement different multi-core processing types. In this regard, a first centralized processing LRU may implement a first multi-core processing type, while a second centralized processing LRU ma implement a second multi-core processing type. For example, the co-pilot centralized processing LRU 212 may implement one or more Freescale P4080 multi-core processors, while the pilot centralized processing LRU 214 may implement one or more Intel-based (e.g., x86) multi-core processors.

In another embodiment, the multiple cores of a multi-core processor of a centralized processing LRU of the system 200 may be configured to execute a first application on a first core of the multi-core processor, a second application on a second core of the multi-core processor, a third application on a third core of the multi-core processor, and so on. In this regard, the multi-core processor of the centralized processing LRUs of the system 200 may be used to consolidate the applications that run on the system into a single processor board. For example, applications such as navigation or terrain databases, flight management, terrain maps, and synthetic vision capabilities may be consolidated onto a single processor board.

In another embodiment, the multi-core processor of a centralized processing LRU of the system 200 may be configured to run multiple operating systems on a single multi-core processor. For example, a first OS may run on a first core of the multi-core processor, a second OS may run on a second core of the multi-core processor, and a third OS may run on a third core of the multi-core processor and so on. For instance, implementation of a hypervisor may allow multiple operating systems to run side-by-side on different cores of the same multi-core processor. For example, a single multi-core processor of a central processing LRU of the system 200 may simultaneously run Integrity, VxWorks, Linux, and LynxOS-178.

The graphics module 228 of the centralized processing LRUs of the system 200 may include any graphics standard known in the art. For example, the graphics module 228 may include any 3D graphics or 2D graphics generator known in the art. For instance, the graphics module 228 of the centralized processing LRUs of the system 200 may include a graphics module based on the Open GL standard. It should be recognized that the Open GL standard is not limiting but rather should be merely interpreted as an illustration. It is recognized herein that a variety of graphics standards may be suitable for implementation in the present invention. In this sense, the centralized processing LRUs of the system 200 may receive input data from various portions of the aircraft via a datalink (e.g., Ethernet, MIL-STD 1553, ARINC 429 or the like) and generate all imagery data (e.g., digital video data) utilizing the onboard graphics module 228.

In another aspect of the present invention, the I/O module 229 of the centralized processing LRUs may include any I/O architecture known in the art. For example, the I/O module 229 of the centralized processing LRUs may include, but is not limited to, an I/O card suitable for interfacing with one or more of the datalink protocols including ethernet, MIL-STD 1553, or ARINC 429. The I/O modules 229 of the centralized processing LRUs are not limited to the above protocols, as the listed protocols should be interpreted merely as illustrative.

In another aspect of the present invention, the merge module 232 of the centralized process LRUs may include any known merge configuration known in the art. For example, the merge module 232 of the centralized processing LRUs of the system 200 may be configured to perform graphics and video merging on the one or more centralized processing LRUs (e.g., 212 or 214) of the system 200. For example, the merge module 232 may include onboard graphics or video generation hardware, such as, but not limited to Graphics Engine 4 (GE4) based hardware. It should be recognized by those skilled in the art that the merge module 232 of the one or more centralized processing LRUs is not limited to GE4 based hardware, but rather the above description should be interpreted merely as an illustration.

Figure 3:
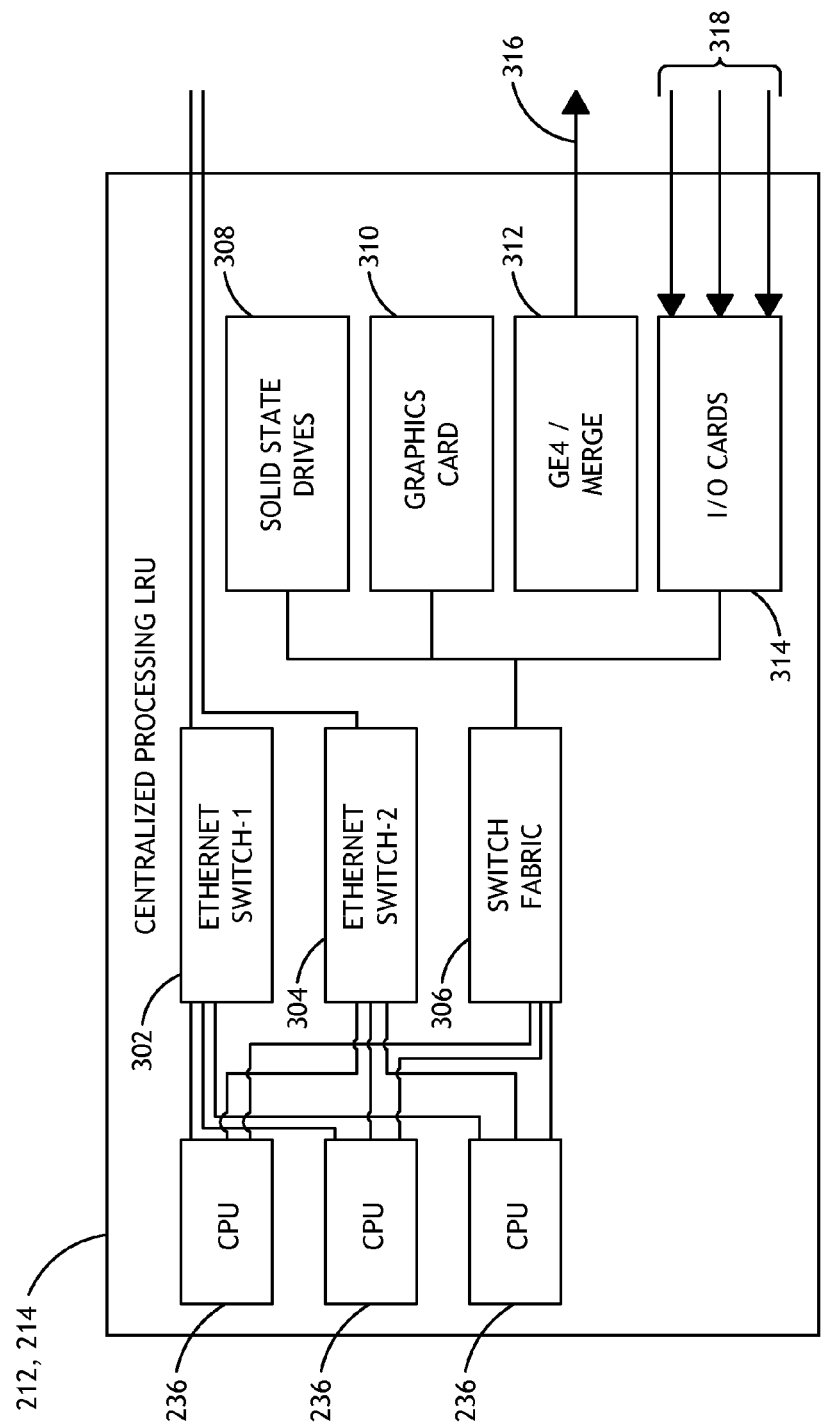
FIG. 3 is a block diagram of a centralized processing line-replaceable unit (LRU) of a modular avionics system, in accordance with one embodiment of the present invention.

FIG. 3 illustrates a detailed block diagram highlighting the high-speed interconnections 230 of a centralized processing LRU in accordance with one embodiment of the present invention. In a general sense, the centralized processing LRUs (e.g., 212 or 214) of the system 200 may include a variety of interconnection protocols. The particular arrangement and included types of interconnects may be based on the specific data speed requirements of the system 200. For example, the high-speed interconnections 230 of the pilot centralized processing LRU 214 may include interconnections based on the 10 Gbit Ethernet protocol, the 1 Gbit Ethernet protocol, or the PCI Express protocol. It should be recognized by those skilled in the art that 10 Gbit Ethernet and 1 Gbit based interconnections are suitable for coupling one or more processors of a first centralized processing LRU with one or more additional processors of an additional LRU, allowing for co-processing between processors of coupled LRUs. It should further be recognized that PCI Express based interconnections may be utilized to couple one or more processors with one or more peripheral devices (e.g., video hardware, networking hardware, or data storage hardware). Alternatively, the PCI express based interconnection may be configured as a point-to-point bus between two processors.

As illustrated in FIG. 3, the one or more processors 236 of the central processing LRU (e.g., 212 or 214) may be coupled to additional processors of one or more additional LRUs via a first Ethernet switch 302 (e.g., 10 Gbit Ethernet switch) and/or a second Ethernet switch 304 (e.g., 1 Gbit Ethernet switch). Further, switch fabric 306 (e.g., PCI express switch fabric) may be utilized to couple the one or more processors 236 of the centralized processing LRU to one or more peripheral devices, such as, but not limited to, one or more solid state drives 308 (e.g., SATA solid state drives), a graphics card 310, a merge module 312 (e.g., GE4), or one or more I/O cards 314 suitable for interfacing with one or more suitable data links 318 (e.g., I/O card suitable to interface with Ethernet, MIL-STD 1553, or ARINC 429).

Referring again to FIG. 2, the one or more MFDs (e.g., 202, 204, or 206) of the system 200 may include a display device 216, a logic module 218, a power supply 220, a bezel input 222, and a touch screen input 224.

It is contemplated herein that the one or more MFDs of the system 200 include only a simple logic module 218 and do not contain an onboard processor or operating system, as video processing takes place on the one or more centralized processing LRUs (e.g., 212 or 214) of the system 200. In one aspect, the logic module of the one or more MFDs of the system 200 consists of a field programmable gate array (FPGA).

In one aspect, the logic module 218 is configured to receive imagery data (e.g., video data) provided by the one or more centralized process LRUs 212 or 214 of the system 200. For example, the logic module 218 of one or more of the co-pilot MFDs 202 may be communicatively coupled to the output of the co-pilot centralized processing LRU 212 and the pilot centralized processing LRU 214 via the data link 238 and 236 (e.g., DVI datalink or SMPTE datalink) respectively.

In another aspect, the logic module 218 of the one or more MFDs of the system 200 may be communicatively coupled to the display device 216 of the one or more MFDs. In this manner, upon receiving the imagery data from the one or more centralized processing LRUs 212 or 214, the logic module 218 of a centralized processing LRU may transmit the imagery data to the display device 216 of the centralized processing LRU.

The display device 216 of the one or more MFDs of the system 200 may include any known display device known in the art. For example, the display device 202 of the one or more MFDs may include, but is not limited to, a liquid crystal display (LCD). The display devices 216 of the MFDs of the system 200 are not limited to LCD devices as it is contemplated additional display technologies (e.g., OLED) may be suitable for implementation in the present invention.

Upon receiving the imagery data from the logic module 218 of the one or more MFD of the system 200, the display devices 216 of the one or more MFDs may display the imagery data (e.g., video data) to a user. In one embodiment, the user may input data associated with the displayed imagery data via a touchscreen device 224 (e.g., capacitive touchscreen or resistive touchscreen). In another embodiment, the user may input data associated with the displayed imagery data via one or more hard keys. For instance, a hard key may include one or more bezel input devices (e.g., bezel key).

In further embodiment, the touchscreen device 224 or the bezel input device 222 may be utilized in order to enter and control environmental factors, such as, but not limited to, brightness, night vision mode, selection of video source, or designation of alternative video sources.

In another aspect of the present invention, the input device (e.g., touchscreen 224 or bezel hard key 222) data is transmitted to the logic module 218 of the one or more MFDs of the system 200. The logic module 218 of the one or more MFDs then transmits the input device data to the centralized processing LRUs of the system 200. For example, after receiving touchscreen and/or bezel key press data from the touchscreen 224 and/or the bezel key 222 respectively, the logic module 218 may transit the inputted data to the co-pilot centralized LRU 212 and/or the pilot centralized LRU 214.

In another aspect of the present invention, the power supply 220 of each of the one or more MFDs (e.g., 102, 104, or 106) may include any suitable power supply known in the art. In this regard, any distributed or local power supply that provides conditioned power suitable for implementation in the context of avionics (e.g. 28 VDC) capable of meeting the requirements of the LRU may be implemented.

Those skilled in the art should recognize that the one or more MFDs of the system 200 are not limited to the components described above. It is contemplated herein that additional components obvious to those skilled in the art may be incorporated in the described infrastructure.

It should further be recognized by those skilled in the art that the concepts described above may be extended to the one or more CDUs of the system 200. In this sense, the description above concerning the operation of the one or more MFDs should be interpreted to extend to the one or more CDUs (e.g., co-pilot CDU 208 or pilot CDU 210) of the system 200.

Figure 4A:
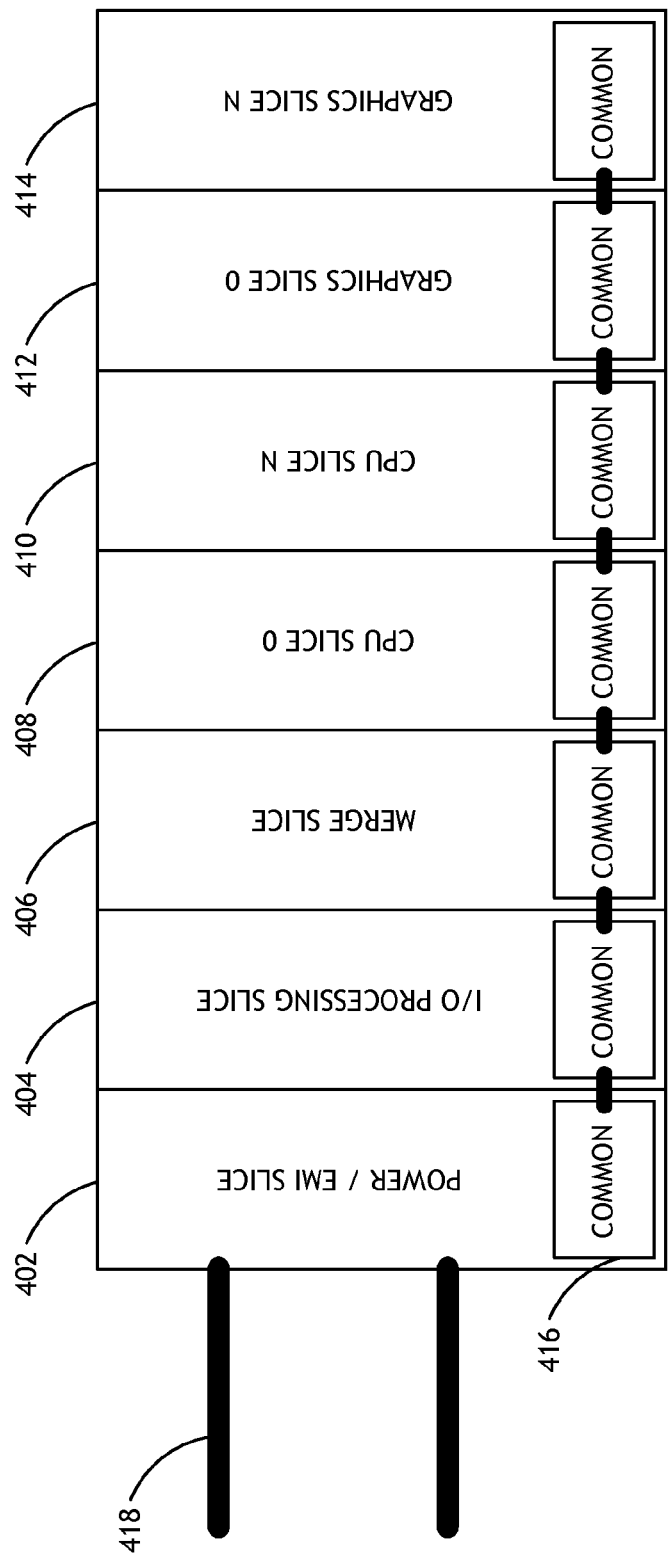
FIG. 4A is a schematic illustration of a slice-constructed centralized processing line-replaceable unit (LRU) of a modular avionics system, in accordance with one embodiment of the present invention.

FIG. 4A illustrates a schematic diagram of a centralized processing LRU 400 of the system 200 constructed utilizing 'slice' architecture, in accordance with one embodiment of the present invention. The depicted slice-based centralized processing LRU 400 may be implemented, for example, as the co-pilot centralized processing LRU 212 or the pilot centralized processing LRU 214 of the system 200. The slice-based centralized processing LRU 400 may include a plurality of component slices. The component slices of the LRU 400 may include, but are not limited to, a Power/EMI slice 402, an I/O processing slice 404, a Merge Slice 406, a first CPU slice 408, up to an Nth CPU slice 410, a first graphics slice 412, and up to an Nth graphics slice 414. It is contemplated herein that the above slices of the centralized processing LRU incorporate both the internal logical structure (i.e., arrangement of components within centralized processing LRU) and the external logical structure (i.e., arrangement of centralized process LRU with respect to additional LRUs (e.g., MFDs or CDUs) of the system 200) as depicted in FIG. 2 of the present disclosure.

Further, each of the slices 402 through 414 may include a set of common high-speed interconnections 416, which act to reconfigurably couple the slices of the centralized processing LRU 400. As such, a centralized processing LRUs 400 may be 'built up' by sequentially adding the independent slices (e.g., 402-414) to one another. In addition, each of the slices may be removed from the stack of slices 400, allowing a user to replace malfunctioning components by replacing an entire associated slice with a new or upgraded slice. For example, in the event the power supply 220 of a given Power/EMI slice 402 of a centralized processing LRU slice stack 400 is malfunctioning or has become obsolete, the user may remove the entire Power/EMI slice and replace it with a new Power/EMI slice 402. By way of another example, during a processing power upgrade, a user may remove the CPU slices 408 and 410 and replace them with a higher performing set of CPU slices. The ability to swap slices and reconfigure the slice stack 400 allows the user to more readily upgrade a given system as only the pertinent slices need be replaced. As such, the slice based architecture reduces the costs of repair and upgrade and extends the life of a given slice-based system 200.

In another aspect, the centralized processing LRU 400 of the system 200 may be communicatively coupled to the additional components of the system 200 via the data connections 418 (e.g., Ethernet). For example, a first centralized processing LRU slice stack 400 (e.g., co-pilot centralized processing LRU) may be coupled to a second centralized process LRU slice stack 400 (e.g., pilot centralized processing LRU) via a 10 Gbps Ethernet connection. In another example, a centralized processing LRU slice stack 400 (e.g., co-pilot centralized processing LRU) may be coupled to one or more MFDs and/or one or more CDUs via a datalink (e.g., DVI or SMPTE) in a manner consistent with the description of FIG. 2. It should be recognized by those skilled in the art that the above description is not limiting but rather should only be interpreted as an illustration.

Figure 4B:
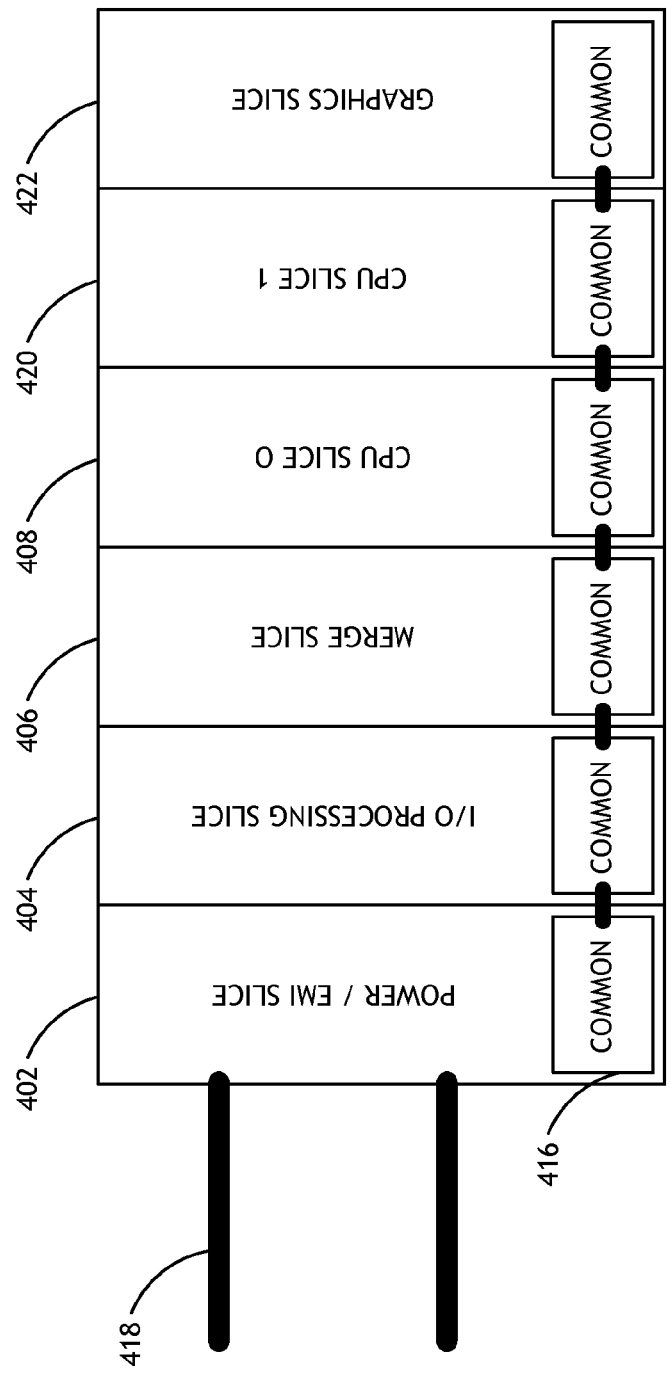
FIG. 4B is a schematic illustration of a slice-constructed centralized processing line-replaceable unit (LRU) of a modular avionics system, in accordance with one embodiment of the present invention.
Figure 4C:
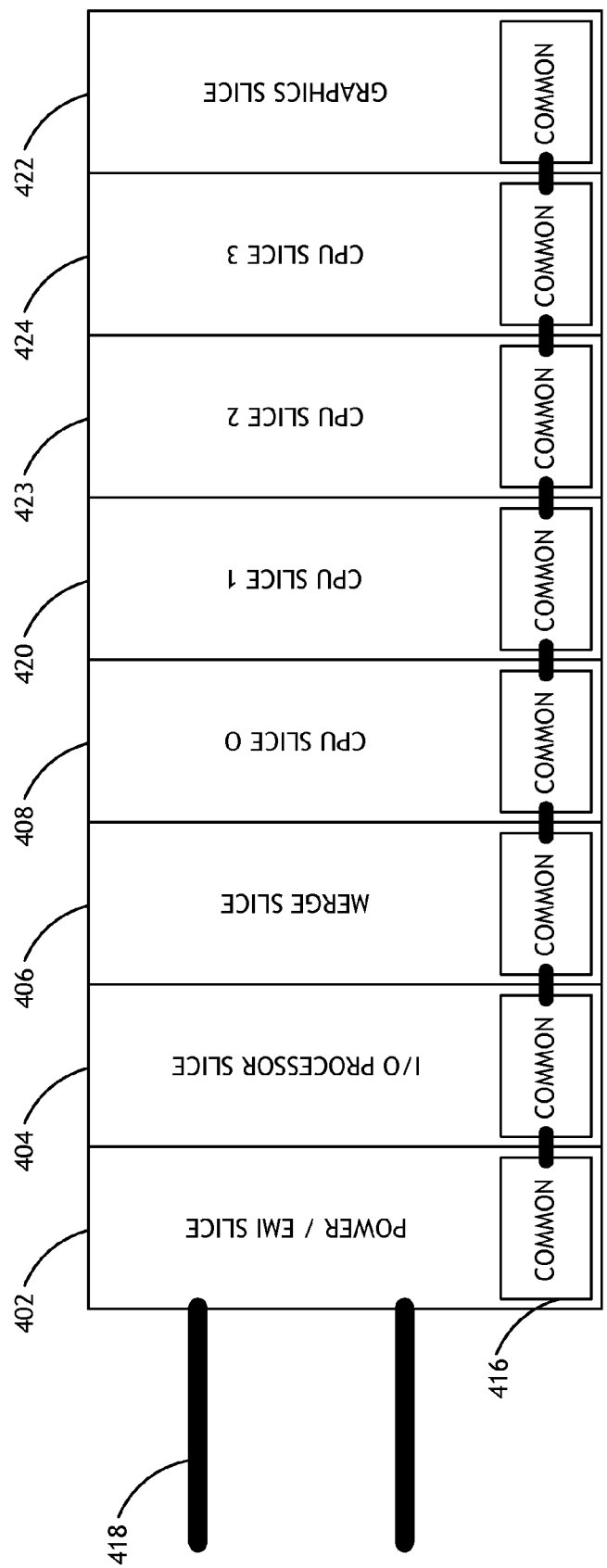
FIG. 4C is a schematic illustration of a slice-constructed centralized processing line-replaceable unit (LRU) of a modular avionics system, in accordance with one embodiment of the present invention.

FIGS. 4B and 4C illustrate the scalability of the centralized processing LRU slice stack 400. FIG. 4B depicts a first stack configuration which includes a Power/EMI slice 402, an I/O processing slice 404, a Merge Slice 406, a first CPU Slice 408 a second CPU Slice 420 and Graphics Slice 422. FIG. 4C depicts a second stack configuration which incorporates additional CPU slices in order to expand the processing power of the centralized processing LRU stack 400. In addition to the Power/EMI slice 402, the I/O processing slice 404, the Merge Slice 406, the first CPU Slice 408, the second CPU Slice 420 and Graphics Slice 422, the second stack configuration further includes a third CPU slice 423 and a fourth CPU slice 424. It should be recognized that the above description is not limiting. It is contemplated herein that any number of additional CPU slices may be added to an existing centralized processing LRU stack 400 in order to expand the processing capabilities of the LRU stack 400 as requirements demand.

In a general sense, while the above description pertains primarily to the one or more centralized processing LRU stacks 400 of the system 200, the slice-based architecture of the present invention is not limited to the centralized processing LRUs. Rather, it is contemplated herein that all of the LRUs (e.g., MFDs, CDUs, and the like) of the system 200 may be constructed utilizing the slice-based architecture similar to that described above.

Figure 5:
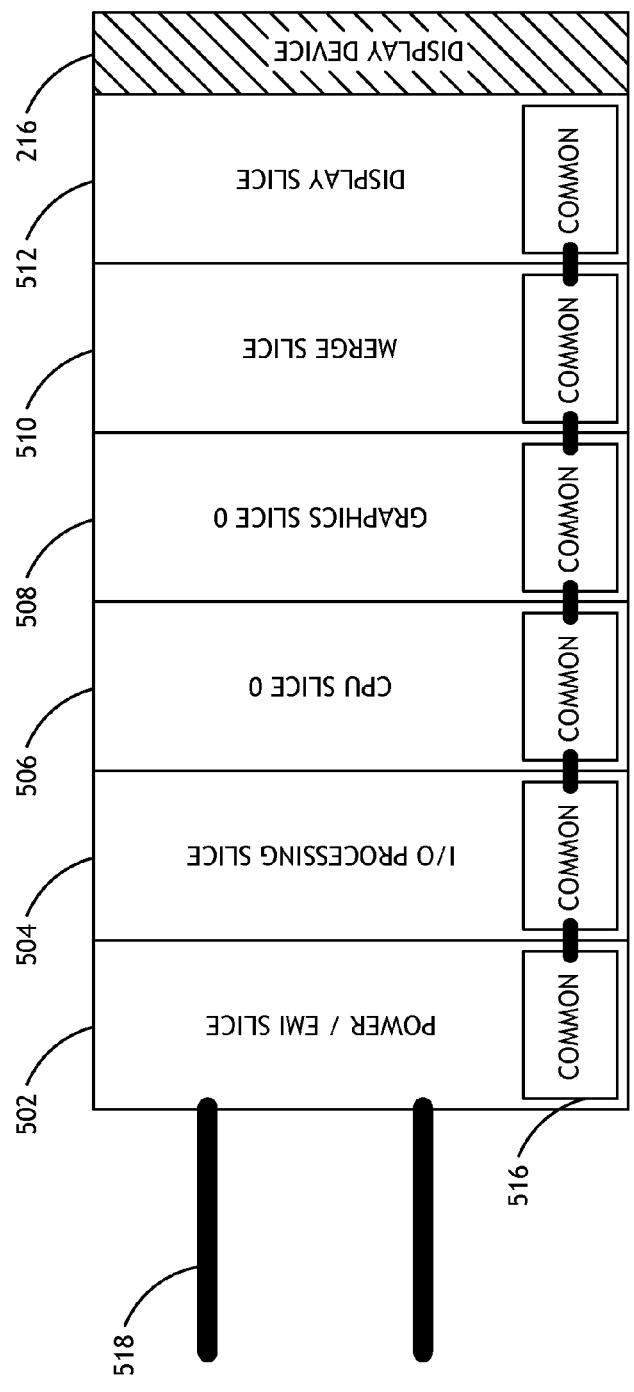
FIG. 5 is a schematic illustration of a slice-constructed multi-function display (MFD) unit of a modular avionics system, in accordance with one embodiment of the present invention.

FIG. 5 illustrates a schematic diagram of a MFD 500 of the system 200 constructed utilizing the 'slice' architecture of the present invention. The depicted slice-based MFD 500 may be implemented, for example, as the one or more co-pilot MFDs 102, the one or more pilot MFDs 104, or the center MFD 106 of the system 200. As in the slice-based centralized processing LRU 400, the slice constructed MFD 500 may include a plurality of component slices. The component slices of the MFD 500 may include, but are not limited to, a Power/EMI Slice 502, an I/O Processing Slice 504, a CPU Slice 506, a Graphics slice 508, a Merge Slice 510, and a Display Slice 512 equipped with a display device 216 (e.g., LCD). It is contemplated herein that the above slices of the centralized processing LRU incorporate both the internal logical structure (i.e., arrangement of components within the one or more MFDs of system 200) and the external logical structure (i.e., arrangement of the one or more MFDs with respect to additional LRUs (e.g., centralized processing LRUs and CDUs) of the system 200) as depicted in FIG. 2 of the present disclosure.

Again, each of the slices 502 through 512 may include a set of common high-speed interconnections 516, which act to reconfigurably couple the slices of the slice-based MFD LRU 500. As such, a slice-based MFD 500 may be 'built up' by sequentially adding the independent slices 502 through 514 to one another.

In this manner, the display slice 512 including the display device 216 (e.g., LCD) may be physically mounted to the remaining slices (i.e., 502-510) of the MFD slice stack 500. In one embodiment, the MFD slice stack 500 may be formed by attaching the display slice 512 (including the display device) to an already existing centralized processing LRU stack 400. In this manner, the centralized processing LRU stack 400 may be converted to a MFD stack 500.

It should further be recognized that the concepts and description provide above with respect to the slice-constructed MFD 500 of the system 200 may be extended to the CDUs (e.g., co-pilot CDU 208 or pilot CDU 210) of the system 200. In this manner, one or more CDUs of the system may be constructed utilizing the slice based framework outline above.

It is contemplated herein that any number of the LRUs of the system 200 may be constructed utilizing the slice based architecture described above. In this sense, the slice based architecture may be limited to a single LRU, such as, but not limited to, a centralized processing LRU (e.g., 212 or 214) of the system 200. In another sense, the slice based architecture may be applied to two or more of the LRUs (e.g., centralized processing LRU, MFDs, or CDUs) of the system 200. Further, it is contemplated herein that all of the LRUs of the system 200 may be constructed utilized the slice-based architecture of the present disclosure.

It should further be recognized that the utilized slice-constructed LRUs are not limited to those described above. The description above relating to the construction of the slice-based centralized processing LRU 400, the slice-based MFD 500, and the slice-based CDU (not shown) should not be interpreted as limiting. Rather, it is contemplated herein that the slice-based architecture of the present invention may be extended to any LRU type known in the art. In this sense, the slices of the modular slice based architecture may be arranged and configured to form any known LRU.

Figure 6:
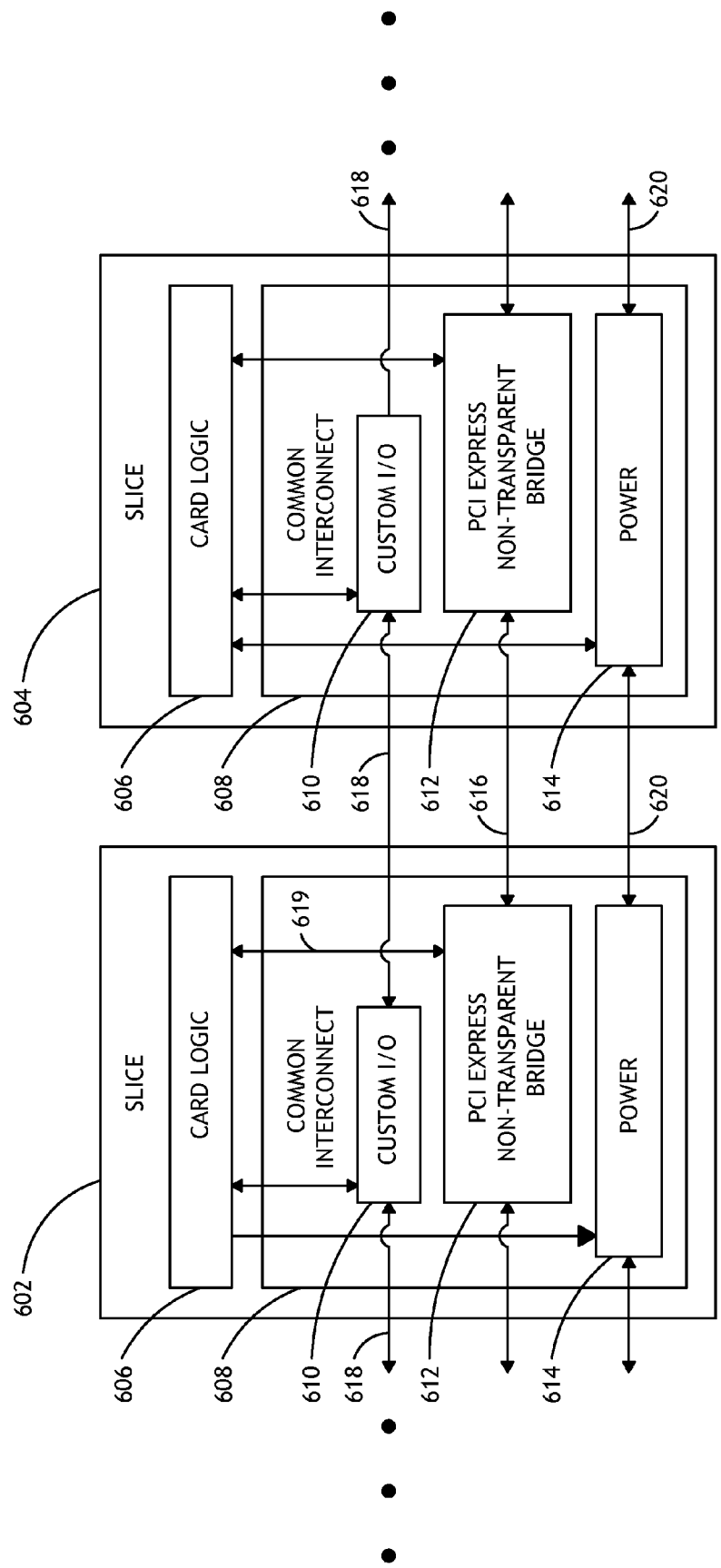
FIG. 6 is a block diagram of a two adjacent slices of a slice-constructed LRU of a modular avionics system, in accordance with one embodiment of the present invention.

FIG. 6 illustrates a block diagram view of the high-throughput common interconnections utilized to communicatively couple a first slice 602 and a second slice 604 of a given slice-based LRU (e.g., centralized processing LRU, MFD, CDU, or the like) in accordance with one embodiment of the present invention. In this embodiment, each slice 602 and 604 may include, but is not limited to, a card logic module 606 and a high-speed common interconnection 608. The common interconnection 608 of each slice may include a custom I/O 610, a PCI Express Non-Transparent Bridge 612, and a power module 614.

In one aspect, the PCI Express Non-Transparent Bridge 612 of each slice may provide a x8 datalink between the given slice and the slices adjacent to the given slice, as well as between the PCI Express Bridge 612 and the logic card 606. For example, the PCI Express Bridge 612 of the first slice 602 may be coupled to the PCI Express Bridge 612 of the second slice 604. While not shown, it is contemplated that the PCI Express Bridge 612 of the first slice 602 may couple to an additional slice to the 'left' of the first slice 602 and the PCI Express Bridge 612 of the second slice 604 may couple to an additional slice to the 'right' of the second slice 604 and so on. In a general sense, it is contemplated that each slice within an LRU constructed via the slice-based architecture of the present invention may include the PCI Express Non-Transparent Bridge 612 as depicted in FIG. 6. Those skilled in the art should recognize that the PCI Express Bridge 612 depicted in FIG. 6 is not limiting, but rather should merely be interpreted as one example of a high-speed bus suitable for communicatively coupling adjacent slices. It is contemplated herein that additional high-throughput busses may be suitable for implementation in the present invention.

In another aspect, the power supply 620 of each slice is electrically coupled to the power supplies 614 of adjacent slices. For example, the power supply 614 of the first slice 602 may be coupled to the power supply 614 of the second slice 604 via an electrical coupling 620. In this regard, the power supply 614 of a given slice may supply a selected amount of power to the given slice and then also pass through power to adjacent slices. For instance, in one embodiment, the power supply 614 may supply 28 V power to the given slice, while passing through 28 V power to neighboring slices.

In another aspect, the custom I/O module 610 of each slice may be coupled to the custom I/O modules 610 of adjacent slices. For example, the custom I/O 610 of the first slice 602 may be coupled to the custom I/O of the second slice 604 of the second slice 604 via data link 618.

In one embodiment, the first slice of a given LRU serves as the "I/O slice," wherein most I/O is carried out. This configuration aids in reducing the need for custom I/O between the various slices of the given LRU. Further, the CPU slices of the given LRU may communicate with the I/O slice via PCI Express through the common interconnection. In this regard, the CPU slices may communicate with the I/O slice via the common interconnection in order to obtain MIL-STD-1553 traffic. In one embodiment, it is anticipated that the custom I/O channel may be utilized for a 10 Gbps Ethernet signal emerging from the CPU slices of the given LRU, which must be routed to additional slices of the LRU or outside of the given LRU (e.g., routed to other LRUs).

In a general sense, each slice of a slice-constructed LRU may include high-speed interconnections (e.g., PCI Express x 8), may be constructed independently from other slices of the LRU, may be constructed in a self-contained configuration such that only common connectors are externally exposed, and may be physically mounted to an adjacent slice.

It is further recognized that the size of a given slice may be selected based on a number of factors. For instance, the size of a given slice may be selected based on the cooling requirements of the components of the slice. Moreover, it should be recognized that the physical size limitations place on the slice-constructed LRU as a whole will constrain the sizes of the individual slices of the slice-constructed LRU.

Figure 7:
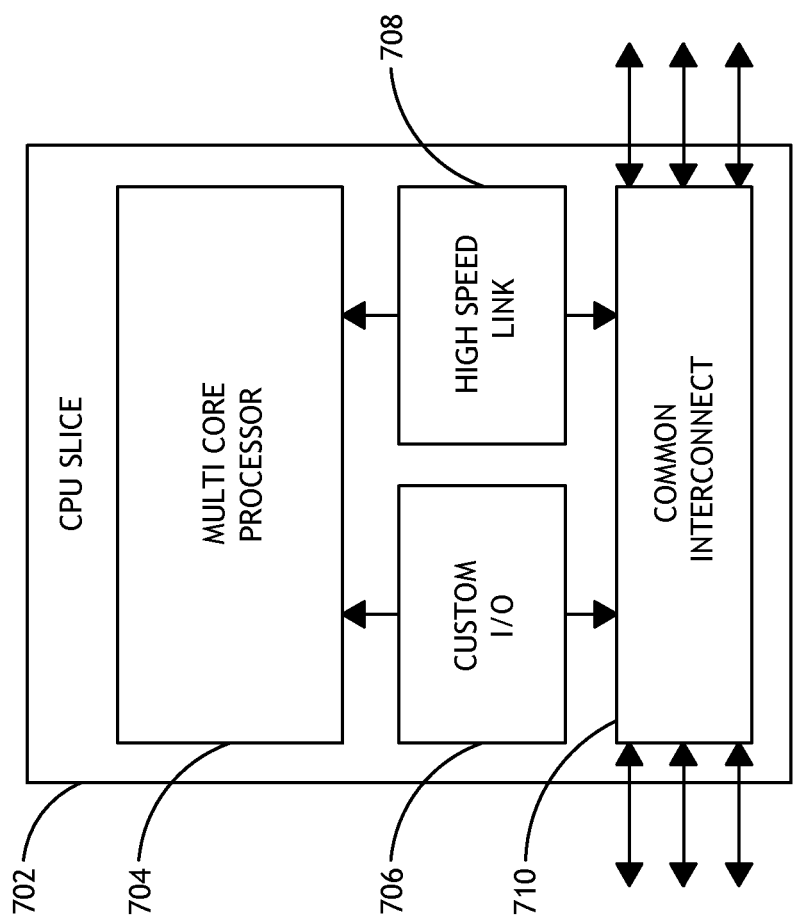
FIG. 7 is a block diagram of a CPU slice of a slice-constructed LRU of a modular avionics system, in accordance with one embodiment of the present invention.

FIG. 7 illustrates a block diagram of a CPU slice 702 of a slice-constructed LRU in accordance with one embodiment of the present invention. In this embodiment, the CPU slice 702 may include one or more multi-core processors 704, a custom I/O module 706, and a high-speed data link configured to couple the common interconnection 710 and the one or more multi-core processors 704. It is contemplated herein that the CPU slice 702 may be implemented as one or more of the CPU slices 408 and 410 of FIG. 4A of a sliced-constructed centralized processing LRU 400. Applicant notes that the framework illustrated in FIG. 7 is consistent with the configuration depicted in FIG. 3 of the present disclosure.

Figure 8A:
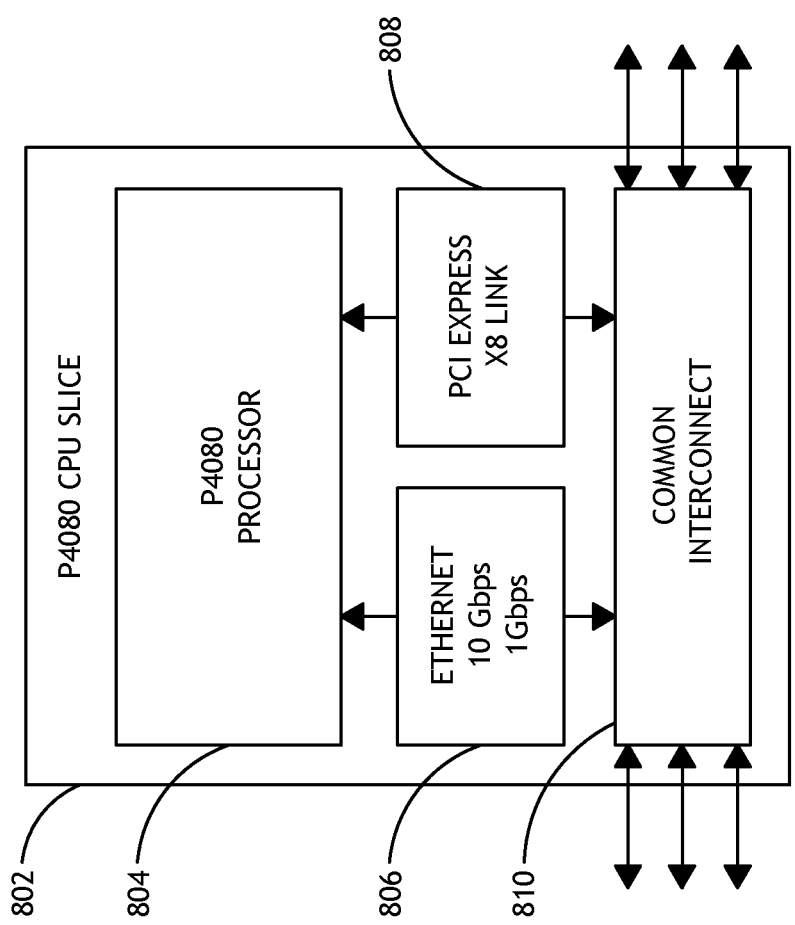
FIG. 8A is a block diagram of a P4080 CPU slice of a slice-constructed LRU of a modular avionics system, in accordance with one embodiment of the present invention.

FIG. 8A illustrates a block diagram of a P4080 CPU slice 802 of a slice-constructed LRU in accordance with a further embodiment of the present invention. In this embodiment, the P4080 CPU slice 802 may include one or more Freescale P4080 multi-core processors 804, a custom I/O module 806 configured for 10 Gbps Ethernet and/or 1 Gbps Ethernet, and a PCI Express x8 Link 808 configured to couple the common interconnection 810 and the one or more P4080 multi-core processors 804.

Figure 8B:
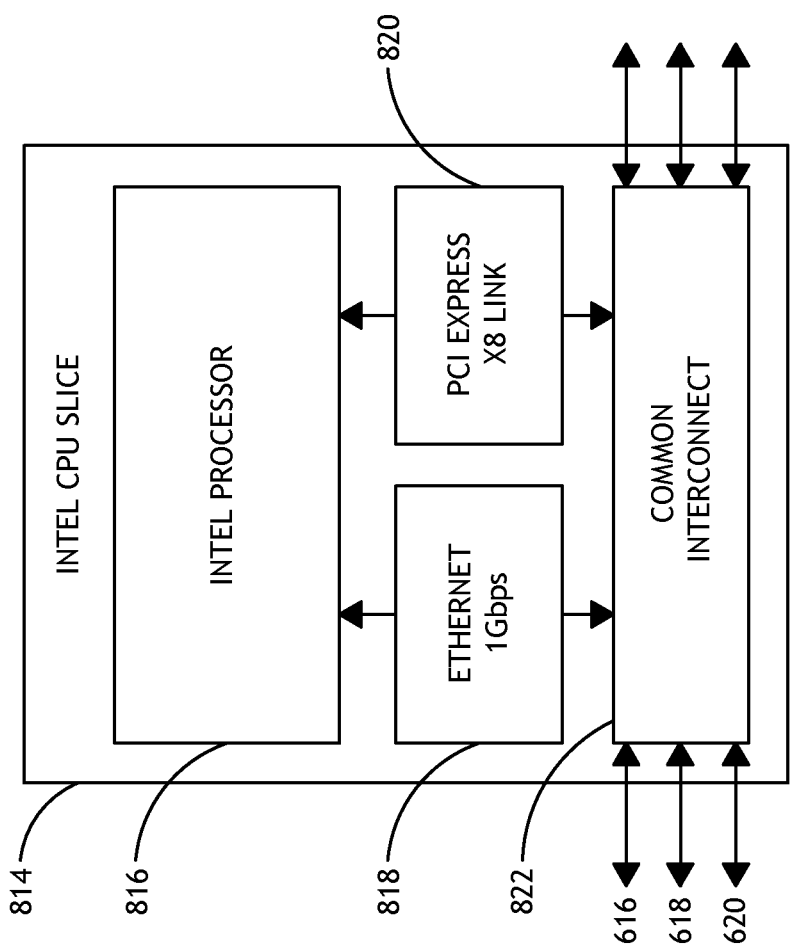
FIG. 8B is a block diagram of an Intel-based CPU slice of a slice-constructed LRU of a modular avionics system, in accordance with one embodiment of the present invention.

FIG. 8B illustrates a block diagram of an Intel CPU slice 814 of a slice-constructed LRU in accordance with a further embodiment of the present invention. In this embodiment, the Intel CPU slice 814 may include one or more Intel-based multi-core processors 816 (e.g., x86 processors), a custom I/O module 818 configured for 1 Gbps Ethernet, and a PCI Express x8 Link 820 configured to couple the common interconnection 822 and the one or more Intel multi-core processors 816. Those skilled in the art should recognize that the CPU slices depicted in FIGS. 7 through 8B are not limiting, but rather should merely be interpreted as examples of CPU slice configurations suitable for implementation in the present invention. Those skilled in the art should recognize that additional CPU slice configurations may be suitable for implementation in the present invention.

Figure 9:
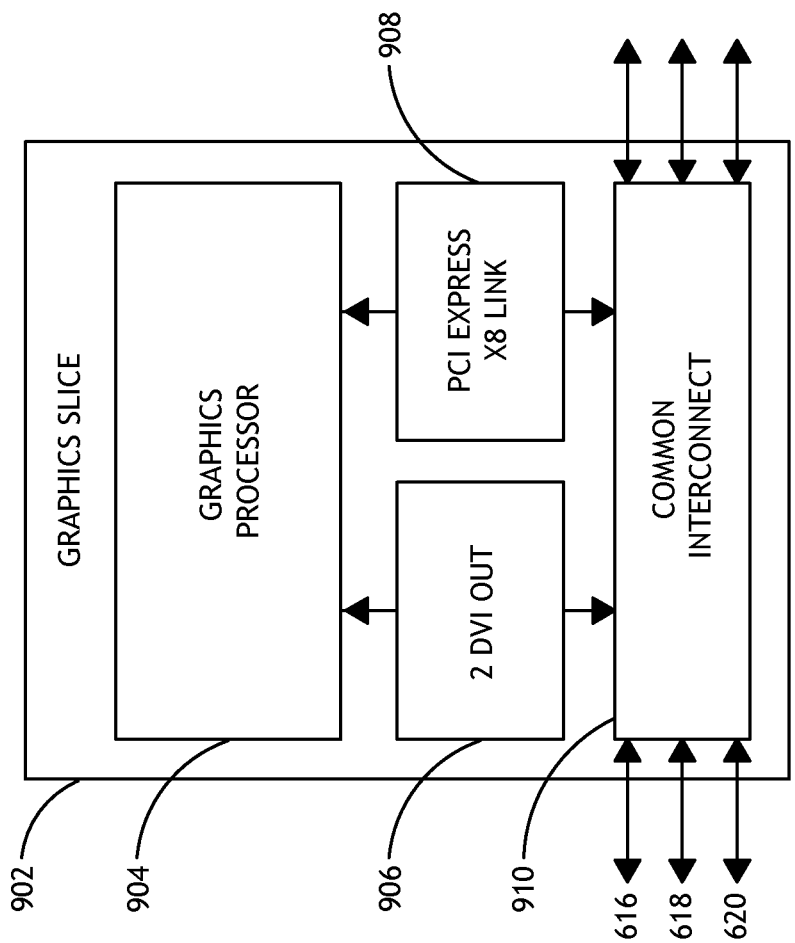
FIG. 9 is a block diagram of a graphics slice of a slice-constructed LRU of a modular avionics system, in accordance with one embodiment of the present invention.

FIG. 9 illustrates a block diagram of a graphics slice 902 of a slice-constructed LRU in accordance with one embodiment of the present invention. In this embodiment, the graphics slice 902 may include one or more graphics processors 904, a custom I/O module 906 configured for DVI or SMPTE, and a high-speed data link, such as a PCI Express x8 link 908 configured to couple the common interconnection 910 and the one or more graphics processors 904. In a further embodiment, the one or more graphics processors 904 of the graphics slice 902 may include, but are not limited to, a graphics processor configured for Open GL 3D graphics. In another embodiment, the graphics slice 902 may include a dedicated PowerPC processor configured for generating 3D graphics and/or 2D graphics for overlays. It is contemplated herein that the graphics slice 902 may be implemented as one or more of the graphics slices 412 and 414 of FIG. 4A of a sliced-constructed centralized processing LRU 400.

Those skilled in the art should recognize that the graphic slice depicted in FIG. 9 is not limiting, but rather should merely be interpreted as an example of a graphics slice suitable for implementation in one or more LRUs (e.g., central processing LRU) of the system 200. It is contemplated herein that additional graphic slice configurations may be suitable for implementation in the present invention.

Figure 10:
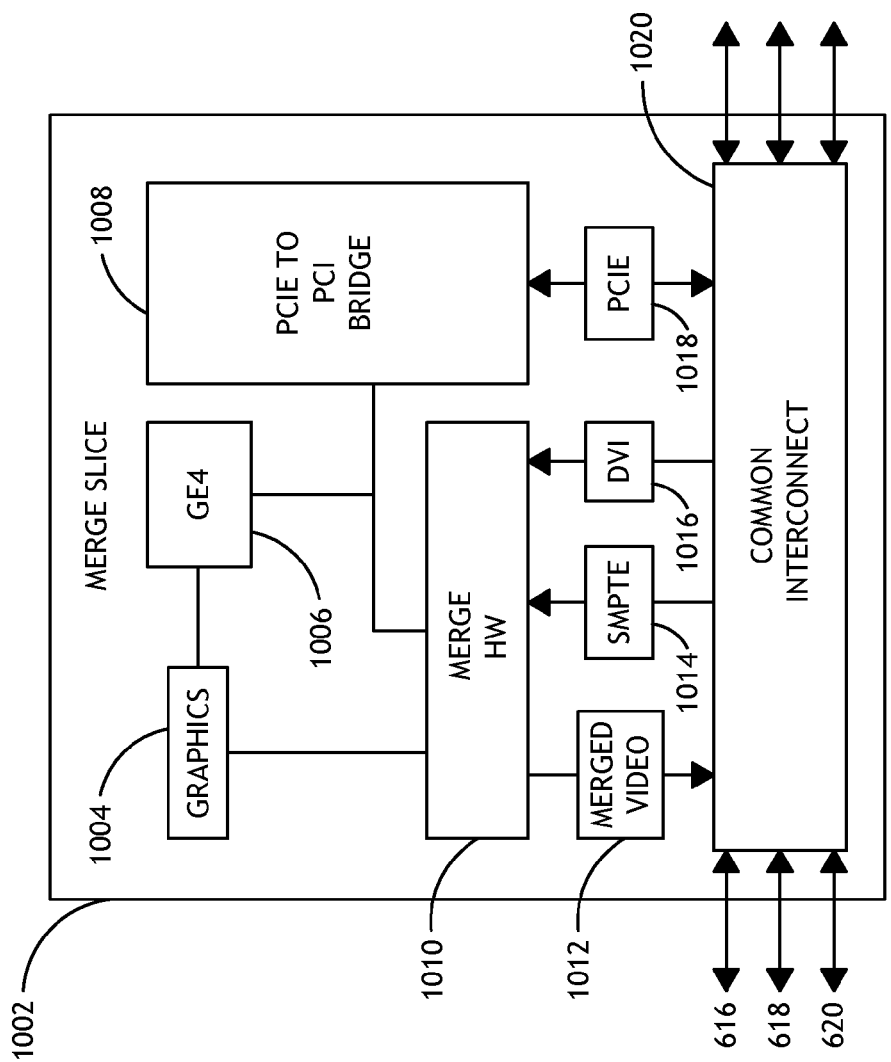
FIG. 10 is a block diagram of a merge slice of a slice-constructed LRU of a modular avionics system, in accordance with one embodiment of the present invention.

FIG. 10 illustrates a block diagram of a merge slice 1002 of a slice-constructed LRU in accordance with one embodiment of the present invention. It should be recognized by those skilled in the art that a centralized processing LRU of the system 200 may perform a graphics and/or video merge function. In this regard, the graphics slice 1002 may be configured to perform the merge of graphics and/or video data. For instance, the output of the graphics slice 902 of a centralized processing LRU 400 may be fed into the merge slice 1002. Following the merge function performed by the merge slice 1002, the video data may be fed to one or more cockpit displays (e.g., co-pilot MFD, co-pilot CDU, pilot MFD, or pilot CDU).

In this embodiment, the merge slice 1002 may include a PCI Express-to-PCI bridge 1008, which is configured to receive PCI express data from the common interconnect 1020 via the PCI express link 1018. In one aspect, video data may be received via the PCI express link and passed on to on-slice graphics, such as GE4 1006. In another aspect, video data may be received via DVI and/or SMPTE data links 1014 and 1016 respectively, which are fed from the common interconnect 1020 to the merge hardware 1010. Following the merge process the merged video may be output via the merged video output link 1012 and passed on to one or more display devices (e.g., MFDs or CDUs) of the system 200. It is contemplated herein that the merge slice 1002 may be implemented as the merge slice 406 of FIG. 4A of a sliced-constructed centralized processing LRU 400.

Those skilled in the art should recognize that the merge slice 1002 depicted in FIG. 10 is not limiting, but rather should merely be interpreted as an example of a merge slice suitable for implementation in one or more LRUs (e.g., central processing LRU) of the system 200. It is contemplated herein that additional merge slice configurations may be suitable for implementation in the present invention.

Figure 11:
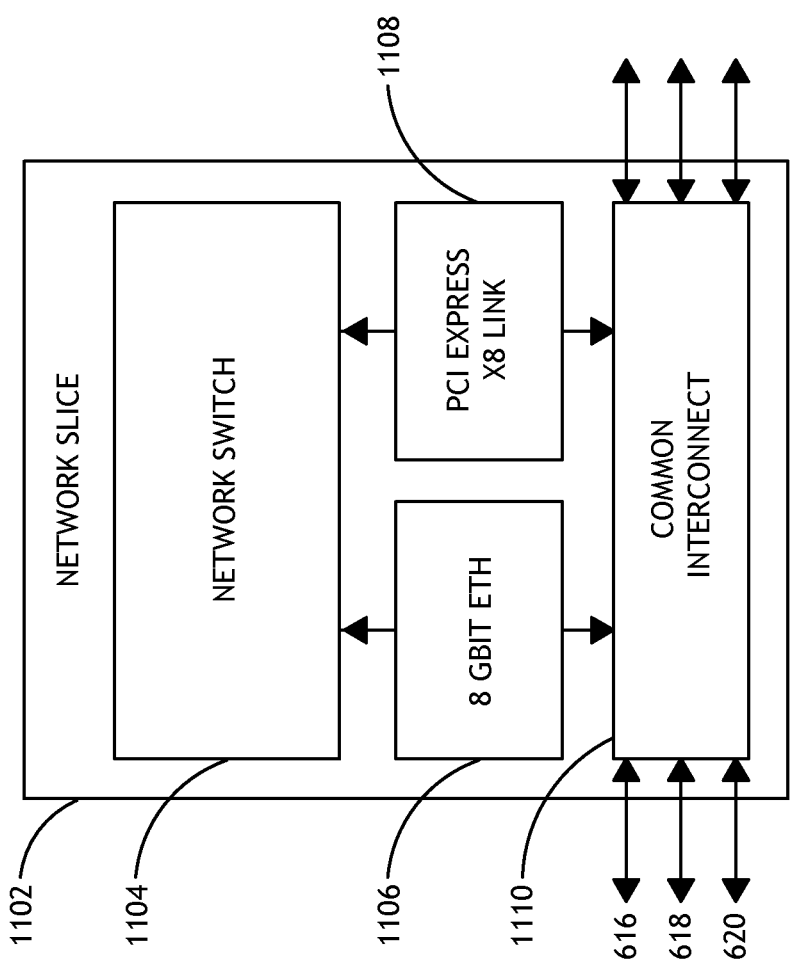
FIG. 11 is a block diagram of a network slice of a slice-constructed LRU of a modular avionics system, in accordance with one embodiment of the present invention.

FIG. 11 illustrates a block diagram of a network slice 1102 of a slice-constructed LRU in accordance with one embodiment of the present invention. In this embodiment, the network slice 1102 may include a network switch 1104, a custom I/O module 1106 configured for 8 Gbit Ethernet, and a high-speed data link, such as a PCI Express x8 link 1108 configured to couple the common interconnection 1110 and the network switch 1104. In a further embodiment, it is contemplated herein that a CPU slice, as described previously herein, may be utilized as a networking slice 1102, wherein a high integrity switch is implemented on top of the multi-core process (e.g., P4080) of the CPU slice. In an alternative embodiment, a COTS Ethernet switch may be implemented into the slice 1102.

Those skilled in the art should recognize that the network slice depicted in FIG. 11 is not limiting, but rather should merely be interpreted as an example of a network slice suitable for implementation in one or more LRUs of the system 200. It is contemplated herein that additional network slice configurations may be suitable for implementation in the present invention. For instance, those skilled in the art should recognize that the networking standard used in the networking slice depicted in FIG. 11 is not limited to Ethernet, as alternative networking standards may be suitable for implementation in the present invention. As such, the Ethernet link in FIG. 11 should be interpreted merely as an illustration.

Figure 12:
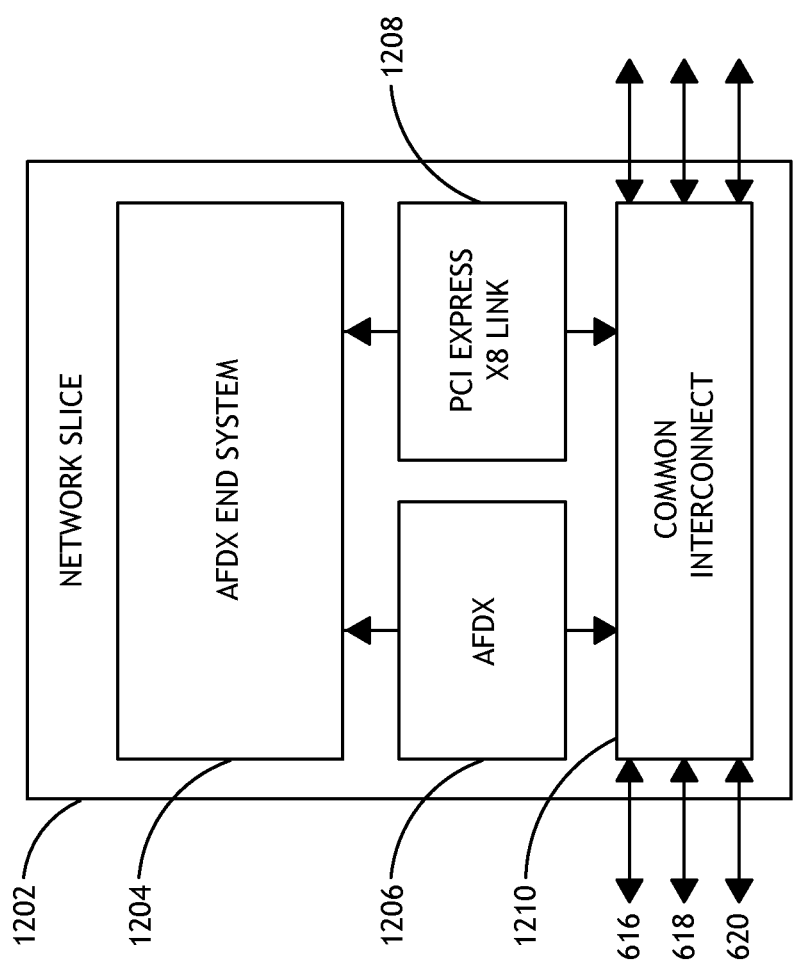
FIG. 12 is a block diagram of an AFDX-based network slice of a slice-constructed LRU of a modular avionics system, in accordance with one embodiment of the present invention.

FIG. 12 illustrates a block diagram of a network slice 1202 suitable for Avionics Full-Duplex Switched Ethernet (AFDX) networking of a slice-constructed LRU in accordance with one embodiment of the present invention. The AFDX networking slice 1202 may include one or more AFDX end systems 1204, an AFDX Ethernet link 1206, and a PCI Express Link 1208 configured to couple the common interconnect 1216 to the AFDX end system 1204. In this embodiment, it is contemplated herein that a CPU slice, as described previously herein, may be utilized as an AFDX networking slice 1202. In a further embodiment, the AFDX networking slice 1202 may include multiple AFDX end systems. In this regard, each of the AFDX end systems may be mapped to the one or more cores of the multi-core processor of the CPU slice of the given LRU of the system 200

Those skilled in the art should recognize that the AFDX network slice depicted in FIG. 12 is not limiting, but rather should merely be interpreted as an example of an AFDX-based network slice suitable for implementation in one or more LRUs of the system 200. It is contemplated herein that additional AFDX-based network slice configurations may be suitable for implementation in the present invention.

Figure 13:
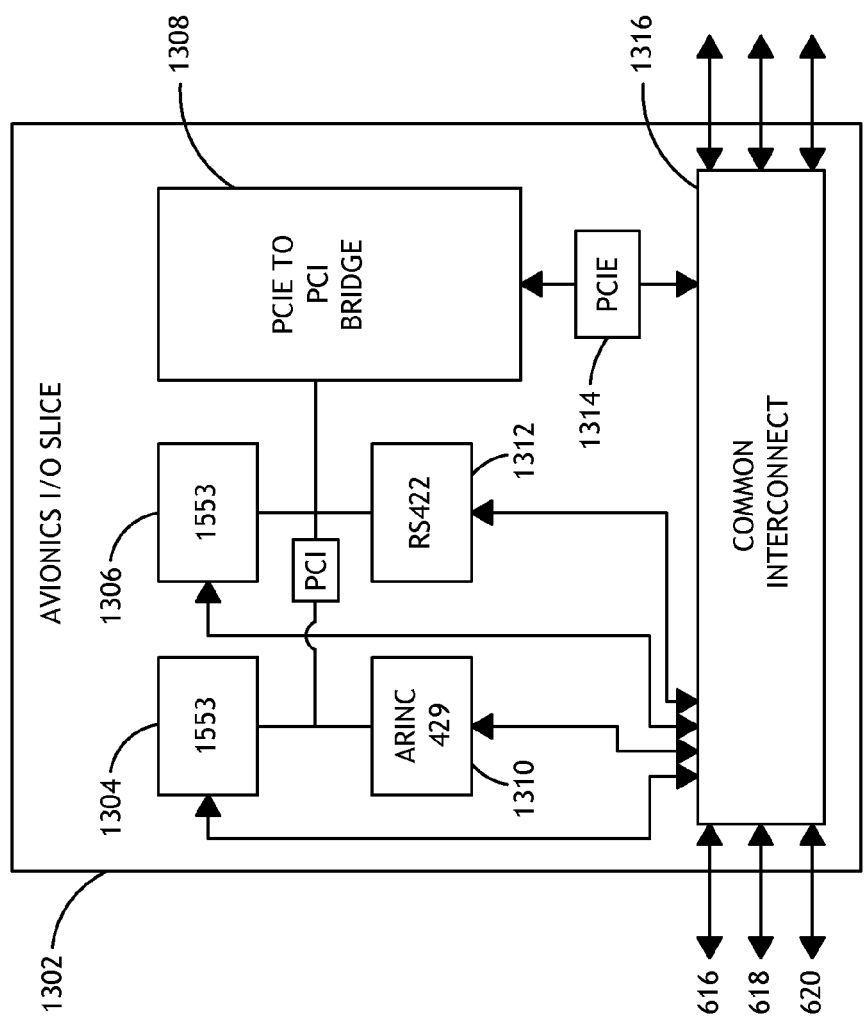
FIG. 13 is a block diagram of an avionics I/O slice of a slice-constructed LRU of a modular avionics system, in accordance with one embodiment of the present invention.

FIG. 13 illustrates a block diagram of an avionics I/O slice 1302 of a slice-constructed LRU in accordance with one embodiment of the present invention. It is contemplated herein that any of the standard avionics busses, such as MIL-STD 1553, ARINC 429, and/or RS422 may be integrated into an I/O slice of the present invention. In this embodiment, the avionics I/O slice 1302 may include a custom I/O module configured for MIL-STD 1553 1304 and 1306, ARINC 429 1310, and/or RS422 1312, and a high-speed data link, such as a PCI Express x8 link 1314 configured to couple the common interconnection 1316 and the PCI express-to-PCI bridge 1308.

Those skilled in the art should recognize that the network slice depicted in FIG. 13 is not limiting, but rather should merely be interpreted as an example of an avionics I/O slice suitable for implementation in one or more LRUs of the system 200. It is contemplated herein that additional network slice configurations may be suitable for implementation in the present invention.

Figure 14:
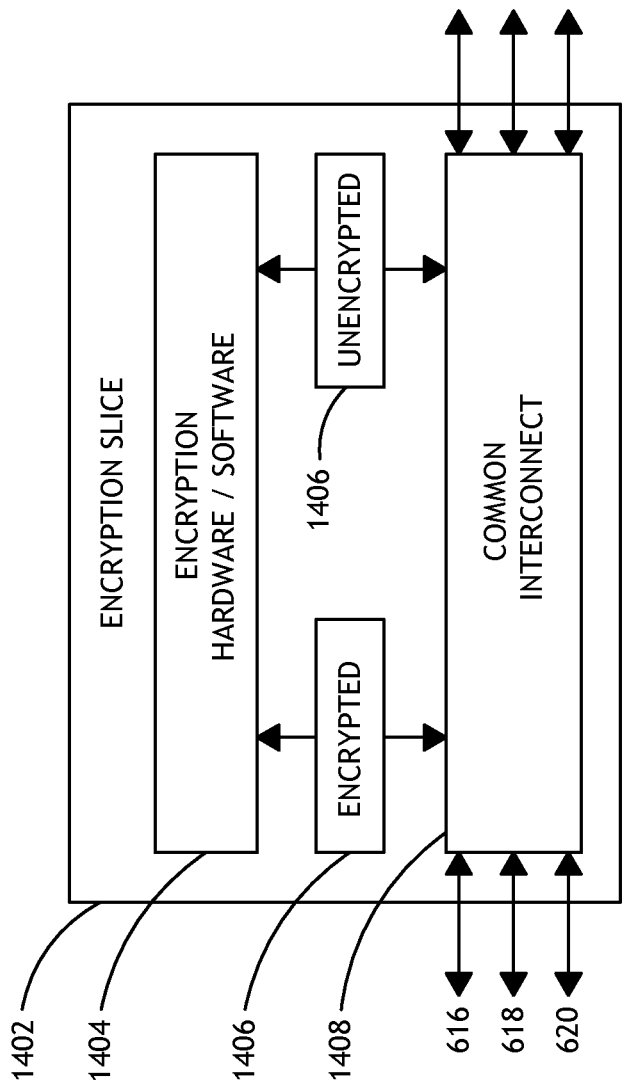
FIG. 14 is a block diagram of an encryption slice of a slice-constructed LRU of a modular avionics system, in accordance with one embodiment of the present invention.

FIG. 14 illustrates a block diagram of an encryption slice 1402 of a slice-constructed LRU in accordance with one embodiment of the present invention. In this embodiment, the encryption slice 1402 may include encryption hardware and software 1404, and a high-speed data link 1406, such as a PCI Express x8 link, 1 Gbps Ethernet or 10 Gbps Ethernet, configured to transmit unencrypted data from the common interconnect to the encryption hardware/software 1404. In one embodiment, the encryption hardware 1404 may include one or multi-core processors, such as, but not limited to, a Freescale P4080 multi-core processor. In another embodiment, the encryption hardware 1404 may include FPGAs or ASICs. Following an encryption process carried out by the encryption algorithm executed by the encryption hardware 1404 the encrypted data may be transmitted to the common interconnect via data link 1408 and outputted from the encryption slice 1402 via the common interconnect 1408 to other portions of the implementing LRU and/or other LRUs of the system 200.

Those skilled in the art should recognize that the encryption slice depicted in FIG. 14 is not limiting, but rather should merely be interpreted as an example of an encryption slice suitable for implementation in one or more LRUs (e.g., central processing LRU) of the system 200. It is contemplated herein that additional graphic slice configurations may be suitable for implementation in the present invention.

Figure 15:
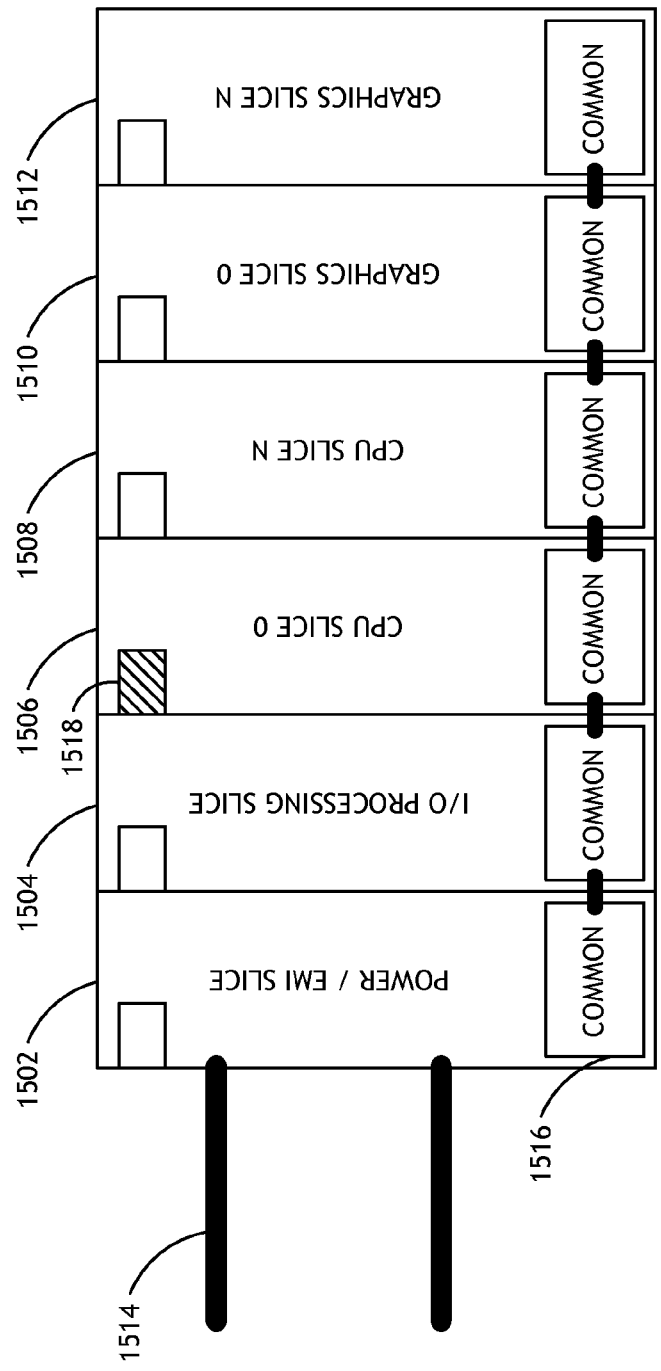
FIG. 15 is a schematic illustration of a slice-constructed centralized processing line-replaceable unit (LRU) equipped with LED malfunction notification capabilities, in accordance with one embodiment of the present invention.

FIG. 15 illustrates a schematic diagram of a centralized processing LRU 1500 of the system 200 equipped with malfunction notification capabilities, in accordance with an alternative embodiment of the present invention. It is contemplated herein that the centralized processing LRU 1500 of FIG. 15 represents an alternative embodiment of the centralized processing LRU 400 of FIG. 4A. The component slices of the LRU 1500 may include, but are not limited to, a Power/EMI slice 1502, an I/O processing slice 1504, a first CPU slice 1506, up to an Nth CPU slice 1508, a first graphics slice 1510, and up to an Nth graphics slice 1512. It should be recognized herein that the present invention is not limited to the slices or LRU-type listed above, but rather these should be interpreted merely as illustrative.

In this alternative embodiment, the centralized processing LRU 1500 may be equipped with one or more malfunction notification devices. In this sense, each of the slices (e.g., CPU slice 1506 or Power/EMI slice 1502) of a given LRU 1500 may be equipped with one or more light emitting diodes (LEDs). Further, each of the slices of the LRU 1500 may be configured to perform internal testing operations (e.g., signal continuity test, power supply stability test, and the like). In response to a measured malfunctioning component of a given slice of the LRU 1500, the slice may switch ON an onboard LED. For example, as shown in FIG. 15, in the event internal testing performed by the CPU slice 1506 determines the CPU slice 1506 is malfunctioning or has malfunctioned, the CPU slice 1506 may supply power to the LED 1518, resulting in its illumination. It should be recognized by those skilled in the art that this capability may be utilized by a user to identify slice or slices in need of replacement, reducing maintenance time and cost. By way of another example, properly operating slices of the LRU 1500 may be configured to provide constant power to an LED such that the LED is ON during periods of proper operation. In contrast, in the event of a slice malfunction, the slice may switch OFF an LED designated to signal "proper operation" and then switch ON an LED for designating a state of malfunction. In this regard, the LED designated for signaling proper operation may have a first color (e.g., green), while the LED designated for signal malfunction may have a second color (e.g., red). It should be recognized by those skilled in the art that the above description of malfunction notification devices is not limiting and should merely be interpreted as an illustration.

Figure 16:
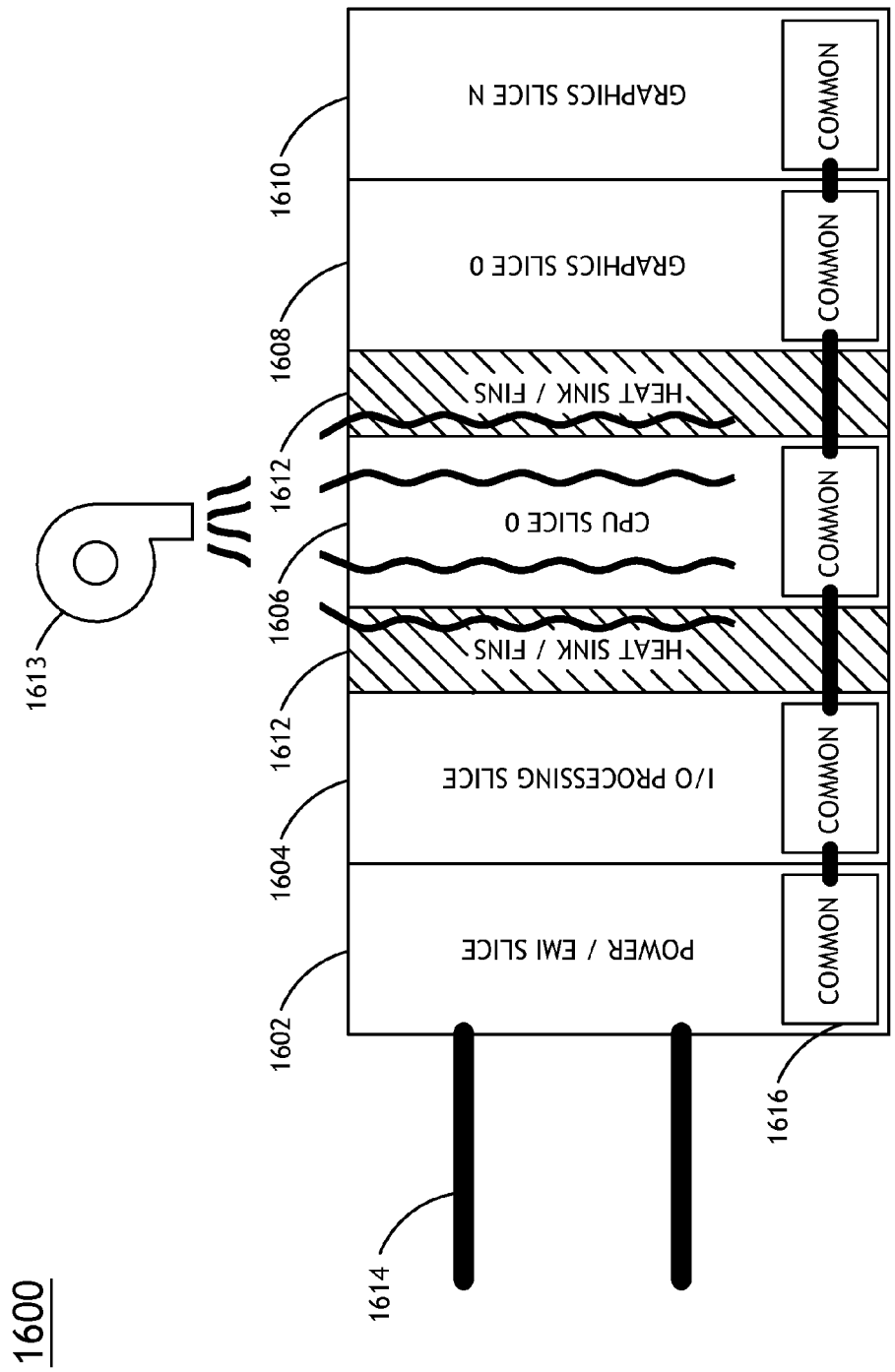
FIG. 16 is a schematic illustration of a slice-constructed centralized processing line-replaceable unit (LRU) equipped with enhanced heat dissipation capabilities, in accordance with one embodiment of the present invention.

FIG. 16 illustrates a schematic diagram of a centralized processing LRU 1600 of the system 200 equipped with heat dissipation capabilities, in accordance with an alternative embodiment of the present invention. It is contemplated herein that the centralized processing LRU 1600 of FIG. 16 represents an alternative embodiment of the centralized processing LRU 400 of FIG. 4A. The component slices of the LRU 1600 may include, but are not limited to, a Power/EMI slice 1602, an I/O processing slice 1604, a first CPU slice 1606, a first graphics slice 1608, and up to an Nth graphics slice 1610. It should be recognized herein that the present invention is not limited to the slices or LRU-type listed above, but rather these should be interpreted merely as illustrative.

In addition, the LRU 1600 may be equipped with one or more built-in heat sinks and/or heat dissipation devices 1612. For example, as shown in FIG. 16, a first heat sink 1612 may be inserted between the I/O processing slice 1604 and the CPU slice 1606, while a second heat sink 1612 may be situated between the CPU slice 1606 and the graphics slice 1608. One particularly advantageous aspect of the slice-based architecture of the present invention is that it allows the placement of heat sinks or heat dissipation devices (e.g., fins) on any of the six sides of a given slice of the LRU 1600. In this regard, it is possible to thermally isolate the CPU slice 1606, providing increased surface area for heat dissipation. In a further embodiment, a forced air device (e.g., fan 1613) may be operably connected to the LRU 1600 and positioned in order to accentuate the heat dissipation of the slices of the LRU 1600. It should be recognized by those skilled in the art that the above description of heat sink/heat dissipation devices of the LRU 1600 is not limiting and should merely be interpreted as an illustration.

Figure 17A:
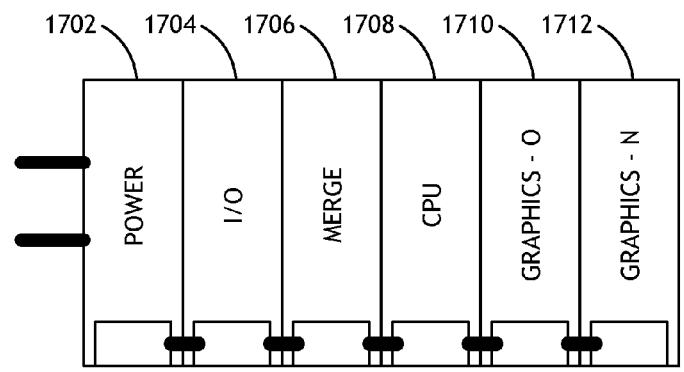
FIG. 17A is a schematic illustration of a slice-constructed centralized processing line-replaceable unit (LRU) of a modular avionics system, in accordance with one embodiment of the present invention.
Figure 17B:
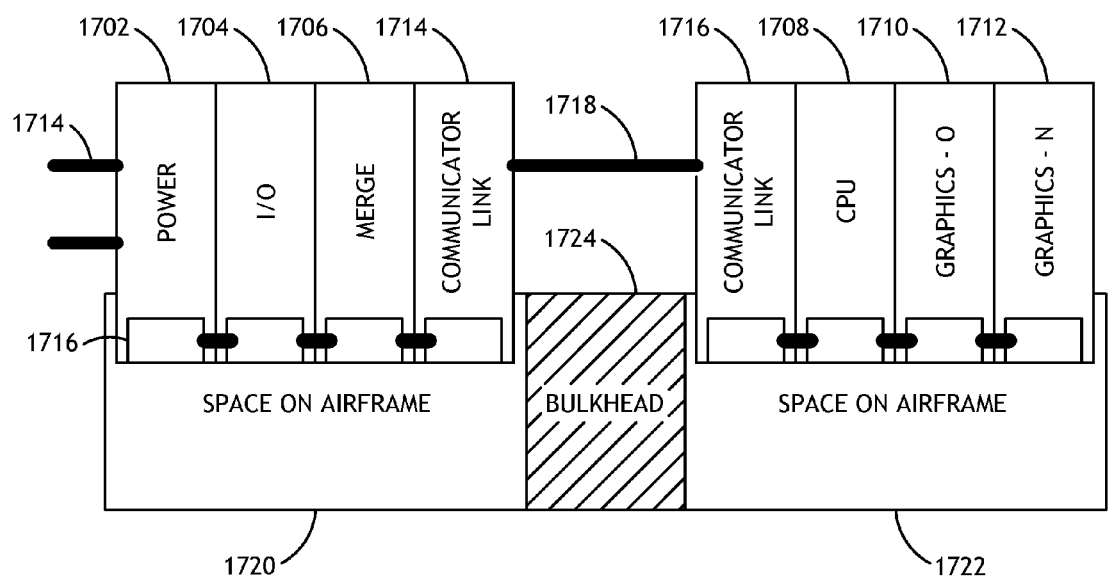
FIG. 17B is a schematic illustration of a segmented slice-constructed centralized processing line-replaceable unit (LRU) of a modular avionics system, in accordance with one embodiment of the present invention.

FIGS. 17A and 17B illustrate a segmented centralized processing line-replaceable unit (LRU) 1700 of a modular avionics system 200, in accordance with an alternative embodiment of the present invention. In this embodiment, a first set of the plurality of component slices and a second set of the plurality of component slices may be physically separated from one another, while also being communicatively coupled. For example, a first set of slices (e.g., slice 1702, 1704, and 1706) of the LRU 1700 may be physically separated from a second set of slices (e.g., 708, 710, and 1712). For instance, as shown in FIG. 17B, a first set of slices (e.g., 1702, 1704, and 1706) may be disposed at a first portion of an aircraft, while a second set of slices (e.g., 1708 and 1710) may be disposed at a second portion of the aircraft. Further, a communicative coupling link 1718 may be utilized to communicatively couple the two physically separated portions of the LRU 1700. In this sense, as shown in FIG. 17B, a first set of slices (e.g., 1702, 1704, and 1706) may be disposed in a first region on an airframe of an aircraft 1720, while a second set of slices (e.g., 1708 and 1710) may be disposed in a second region of the airframe of the aircraft 1722 positioned on the opposite side of the aircraft bulkhead 1724 as the first set of slices. The two portions of the LRU 1700 may be coupled via the communications link 1718 (e.g., Infiniband). It should be recognized by those skilled in the art that the above description of the segmented LRU 1700 is not limiting and should merely be interpreted as an illustration.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected", or "coupled", to each other to achieve the desired functionality, and any two components capable of being so associated can also be viewed as being "couplable", to each other to achieve the desired functionality. Specific examples of couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present.

For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Although particular embodiments of this invention have been illustrated, it is apparent that various modifications and embodiments of the invention may be made by those skilled in the art without departing from the scope and spirit of the foregoing disclosure. Accordingly, the scope of the invention should be limited only by the claims appended hereto.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed:

1. A modular avionics system, comprising:
one or more centralized processing line-replaceable units (LRUs), wherein the one or more centralized processing LRUs include at least one multi-core computer processor;
one or more multi-function display (MFD) units configured to receive imagery data from the one or more centralized processing LRUs and display the imagery data on at least one display device of the one or more MFD units;
one or more control display units (CDUs) configured to receive imagery data from the one or more centralized processing LRUs and display the imagery data on at least one display device of the one or more CDUs, wherein each of the one or more MFD units and the one or more CDUs include one or more user input devices, wherein each of the one or more MFD units and the one or more CDUs include at least one logic module, wherein the one or more CDUs and the one or more MFD units are configured to transmit user input data from the user input devices to the one or more centralized processing LRUs, wherein the one or more centralized processing LRUs are constructed from a plurality of component slices, wherein a first component slice of the plurality of component slices and at least a second component slice of the plurality of component slices are reversibly couplable via a high-speed common interconnection.

2. The modular avionics system of claim 1, wherein a first set of the plurality of component slices and a second set of the plurality of component slices are physically separated, wherein the first set of the plurality of component slices and the second set of the plurality of component slices are communicatively coupled.

3. The modular avionics system of claim 1, wherein at least one of the plurality of component slices comprises at least one of a CPU slice, a power slice, an I/O processing slice, a merge slice, or a graphics slice.

4. The modular avionics system of claim 1, wherein the at least one multi-core computer processor of the one or more centralized processing LRUs includes a first core and at least a second core, wherein the first core is configured to execute at least a first application and the at least a second core is configured to execute at least a second application.

5. The modular avionics system of claim 1, wherein the at least one multi-core computer processor of the one or more centralized processing LRUs includes a first core and at least a second core, wherein the first core is configured to run a first operating system and the at least a second core is configured to operate a second operating system.

6. The modular avionics system of claim 1, wherein the high-speed common interconnection comprises at least one of PCI express data link, a 10 Gbps Ethernet data link, or a 1 Gbps Ethernet data link.

7. The modular avionics system of claim 1, wherein at least one operational characteristic of the one or more centralized processing LRUs is scalable.

8. The modular avionics system of claim 7, wherein the at least one operational characteristic comprises at least one of a processing power of the one or more centralized processing LRUs, a data transfer rate of the one or more centralized processing LRUs, a power capability of the one or more centralized processing LRUs, or the graphics processing capabilities of the one or more centralized processing LRUs.

9. The modular avionics system of claim 1, wherein the one or more centralized processing LRUs are reconfigurable.

10. The modular avionics system of claim 1, further comprising:
at least one additional LRU.

11. The modular avionics system of claim 10, wherein the at least one additional LRU is constructed from an additional plurality of component slices.

12. The modular avionics system of claim 1, wherein the at least of the at least one display device of the one or more CDUs and the at least one display device of the one or more MFDs comprise a liquid crystal display (LCD).

13. The modular avionics system of claim 1, wherein at least one of the at least one display device of the one or more CDUs or the at least one display device of the one or more MFD units comprise an organic light emitting device (OLED).

14. The modular avionics system of claim 1, wherein at least one of the at least one logic module of the one or more CDUs or the at least one logic module of the one or more MFD units comprise at least one of a field programmable gate array (FPGA) or an application specific integrated circuit (ASIC).

15. The modular avionics system of claim 1, wherein at least one of the one or more user input devices of the one or more MFD units or the one or more user input devices of the one or more CDUs comprises at least one of a touchscreen input device or a bezel key input.

16. A modular avionics system, comprising:
one or more centralized processing line-replaceable units (LRUs), wherein the one or more centralized processing LRUs include at least one multi-core computer processor;
one or more multi-function display (MFD) units configured to receive imagery data from the one or more centralized processing LRUs and display the imagery data on at least one display device of the one or more MFD units; and
one or more control display units (CDUs) configured to receive imagery data from the one or more centralized processing LRUs and display the imagery data on at least one display device of the one or more CDUs, wherein each of the one or more MFD units and the one or more CDUs include one or more user input devices, wherein each of the one or more MFD units and the one or more CDUs include at least one logic module, wherein the one or more CDUs and the one or more MFD units are configured to transmit user input data from the user input devices to the one or more centralized processing LRUs,
wherein at least one of the one or more centralized processing LRUs, the one or more MFD units, or the one or more CDUs are constructed utilizing a slice-based architecture.

17. The modular avionics system of claim 16, wherein the one or more MFD units are constructed from a plurality of component slices, wherein a first component slice of the plurality of component slices and at least a second component slice of the plurality of component slices are reversibly couplable via a high-speed common interconnection.

18. The modular avionics system of claim 16, wherein the one or more CDUs are constructed from a plurality of component slices, wherein a first component slice of the plurality of component slices and at least a second component slice of the plurality of component slices are reversibly couplable via a high-speed common interconnection.

19. The modular avionics system of claim 1, wherein the at least of the at least one display device of the one or more CDUs and the at least one display device of the one or more MFD units comprise a liquid crystal display (LCD).

20. The modular avionics system of claim 1, wherein at least one of the at least one display device of the one or more CDUs or the at least one display device of the one or more MFD units comprise an organic light emitting device (OLED).

21. The modular avionics system of claim 1, wherein at least one of the at least one logic module of the one or more CDUs or the at least one logic module of the one or more MFD units comprise at least one of a field programmable gate array (FPGA) or an application specific integrated circuit (ASIC).

22. The modular avionics system of claim 1, wherein at least one of the one or more user input devices of the one or more MFD units or the one or more user input devices of the one or more CDUs comprises at least one of a touchscreen input device or a bezel key input.

23. A modular avionics system, comprising:
one or more centralized processing line-replaceable units (LRUs), wherein the one or more centralized processing LRUs includes a plurality of computation devices;
one or more multi-function display (MFD) units configured to receive imagery data from the one or more centralized processing LRUs and display the imagery data on at least one display device of the one or more MFD units;
one or more control display units (CDUs) configured to receive imagery data from the one or more centralized processing LRUs and display the imagery data on at least one display device of the one or more CDUs, wherein each of the one or more MFD units and the one or more CDUs include one or more user input devices, wherein each of the one or more MFD units and the one or more CDUs include at least one logic module, wherein the one or more CDUs and the one or more MFD units are configured to transmit user input data from the user input devices to the one or more centralized processing LRUs, wherein the one or more centralized processing LRUs are constructed from a plurality of component slices, wherein a first component slice of the plurality of component slices and at least a second component slice of the plurality of component slices are reversibly couplable via a high-speed common interconnection.

24. The modular avionics system of claim 1, wherein the plurality of computation devices comprises at least one of a plurality of computer processors having at least one core, a plurality of reconfigurable logic devices, or a plurality of special purpose logic devices.

* * * * *